(12) United States Patent
Oyagi

(10) Patent No.: US 8,599,246 B2
(45) Date of Patent: Dec. 3, 2013

(54) STORAGE MEDIUM STORING DISPLAY CONTROLLING PROGRAM, DISPLAY CONTROLLING APPARATUS, DISPLAY CONTROLLING METHOD AND DISPLAY CONTROLLING SYSTEM

(75) Inventor: Yasuyuki Oyagi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 619 days.

(21) Appl. No.: 12/858,639

(22) Filed: Aug. 18, 2010

(65) Prior Publication Data

US 2011/0304707 A1 Dec. 15, 2011

(30) Foreign Application Priority Data

Jun. 11, 2010 (JP) ................................. 2010-133905

(51) Int. Cl.
*H04N 7/18* (2006.01)
(52) U.S. Cl.
USPC .............................................. 348/51; 348/55
(58) Field of Classification Search
USPC ...................................................... 348/42–60
See application file for complete search history.

(56) References Cited

U.S. PATENT DOCUMENTS

| 5,969,850 | A * | 10/1999 | Harrold et al. ................. 359/320 |
| 6,388,666 | B1 * | 5/2002 | Murray ........................... 345/473 |
| 6,677,939 | B2 * | 1/2004 | Uchiyama ...................... 345/419 |
| 7,957,581 | B2 * | 6/2011 | Wu ................................. 382/154 |
| 2003/0012425 | A1 | 1/2003 | Suzuki et al. | |
| 2003/0025082 | A1 | 2/2003 | Brewington et al. | |
| 2003/0179198 | A1 | 9/2003 | Uchiyama | |
| 2006/0123150 | A1 * | 6/2006 | Iwai et al. ....................... 710/15 |
| 2006/0192746 | A1 * | 8/2006 | Ioki et al. ....................... 345/102 |
| 2007/0165304 | A1 | 7/2007 | Tomita | |
| 2011/0193863 | A1 * | 8/2011 | Gremse et al. ................. 345/419 |

FOREIGN PATENT DOCUMENTS

| JP | 3-119889 | | 5/1991 | |
| JP | 2000-152285 | | 5/2000 | |
| JP | 2003107603 | A * | 4/2003 | ............. G03B 35/20 |
| JP | 2004-248106 | | 9/2004 | |
| WO | 2011/114567 A1 | | 9/2011 | |

OTHER PUBLICATIONS

JP 2003107603, Machine Translation from Japanese to English, http://dossier1.ipdl.inpit.go.jp/AIPN/odse_call_transl.ipdl?N0000=7413&N0005=Ei7BzenZVnBvfz7D1ZIK&N0120=01&N2001=2&N3001=2003-107603&Ntt3=&Ntt4=&Ntt5=&Ntt6=&Ntt7=&Ntt8=&Ntt9=&Ntt10=&Ntt11=&Ntt12=.*
Office Action (2 pgs.) dated Apr. 10, 2012 issued in corresponding Japanese Application No. 2010-133905.

* cited by examiner

*Primary Examiner* — Andy Rao
(74) *Attorney, Agent, or Firm* — Nixon & Vanderhye, P.C.

(57) ABSTRACT

A game apparatus displays a virtual space on a stereoscopic LCD (hereinafter referred to as 3D display) allowing for an autostereoscopic display, and images a stereoscopic image for displaying an object in a three-dimensional manner and a planar image for displaying the object in a two-dimensional manner (hereinafter referred to as 2D display) in the virtual space with virtual cameras. A computer performs a 3D display on the stereoscopic LCD by utilizing the imaged stereoscopic image and a 2D display on the stereoscopic LCD by utilizing the imaged planar image. Furthermore, the computer accepts an input from a button, a microphone, etc. to control the object. Then, in a case that a non-input state continues past a predetermined time period during the 3D display, the 3D display is switched to the 2D display.

39 Claims, 14 Drawing Sheets

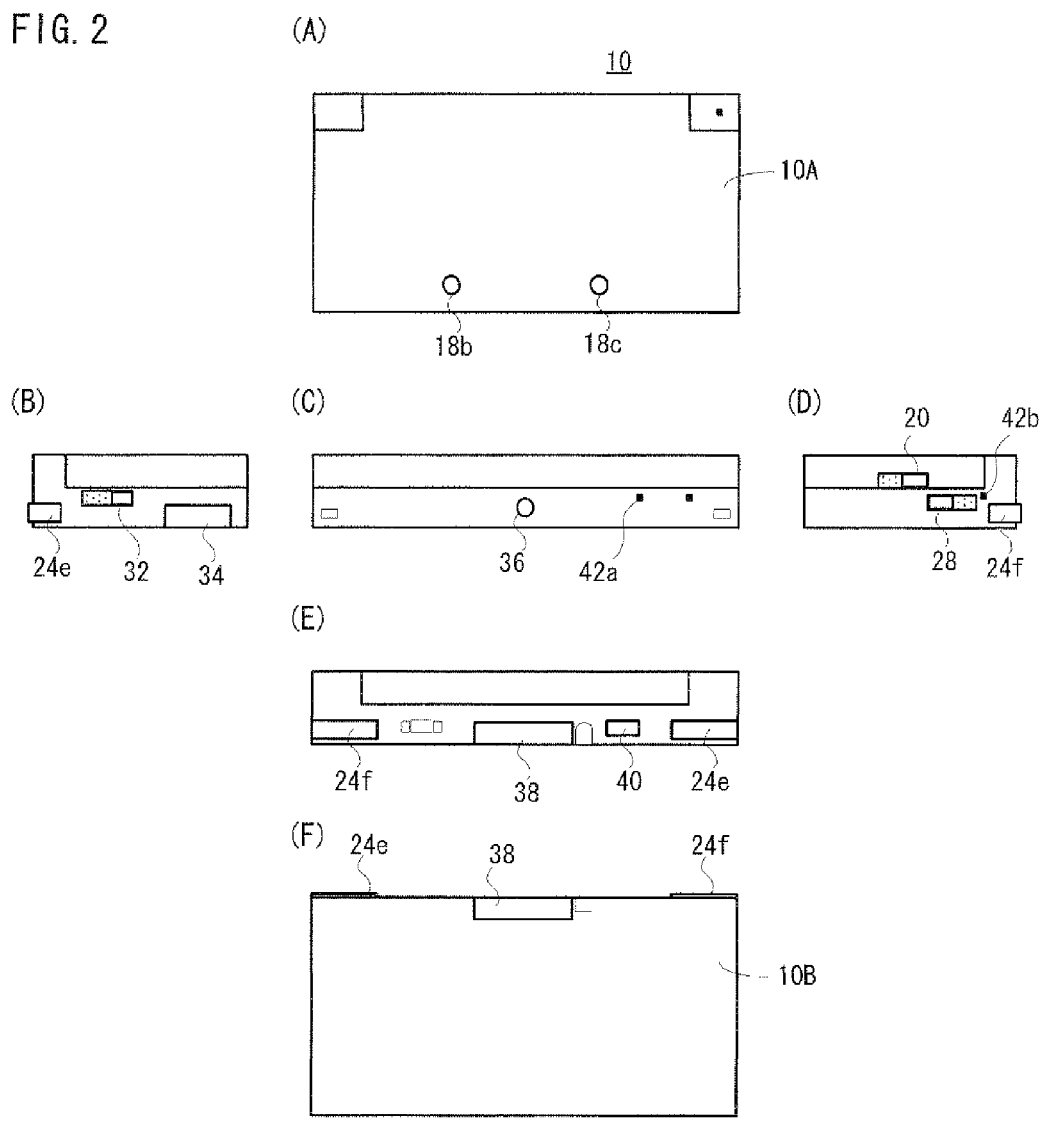
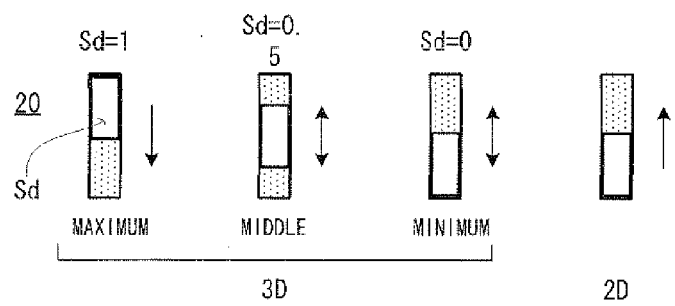

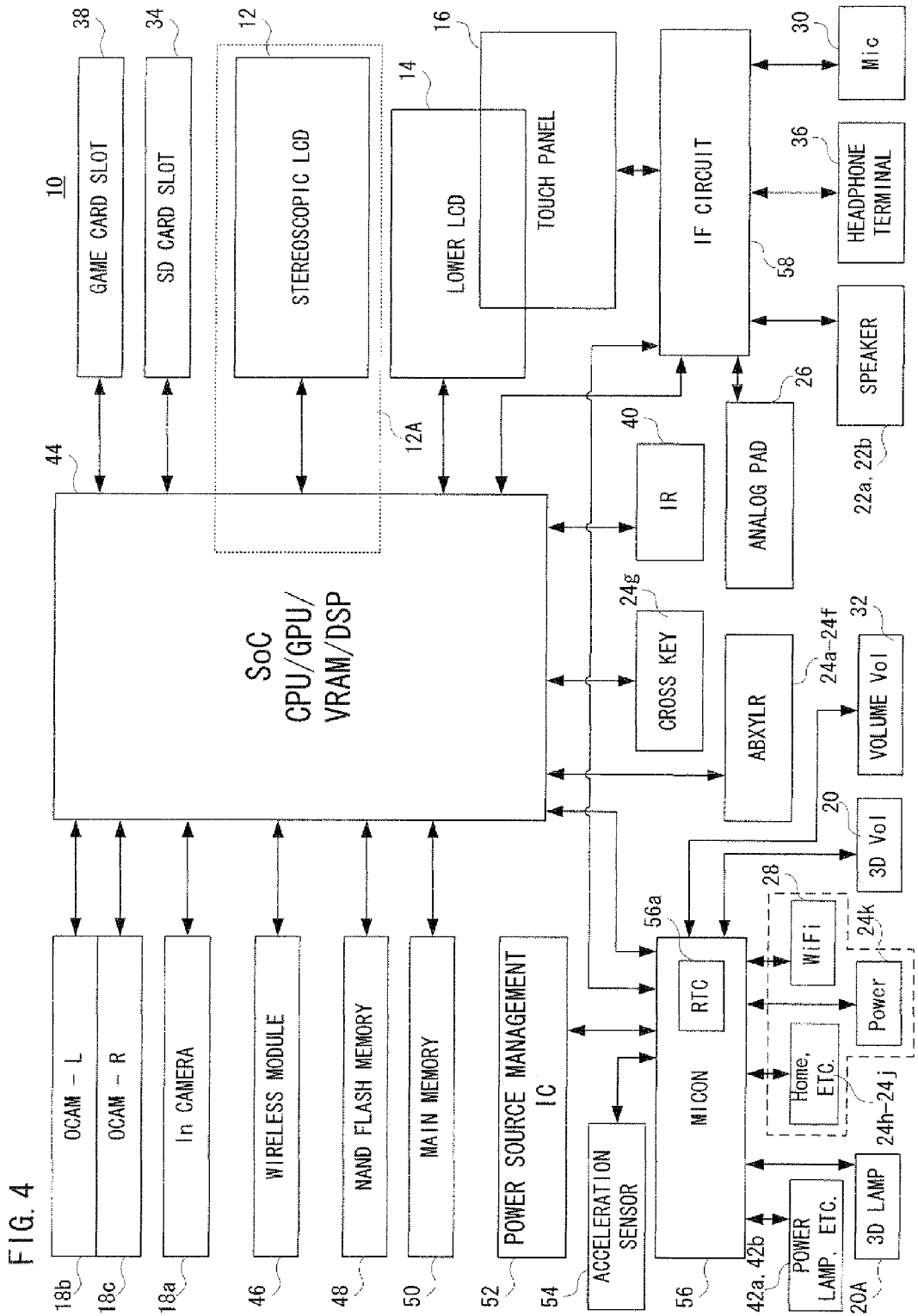

FIG. 6
(A)
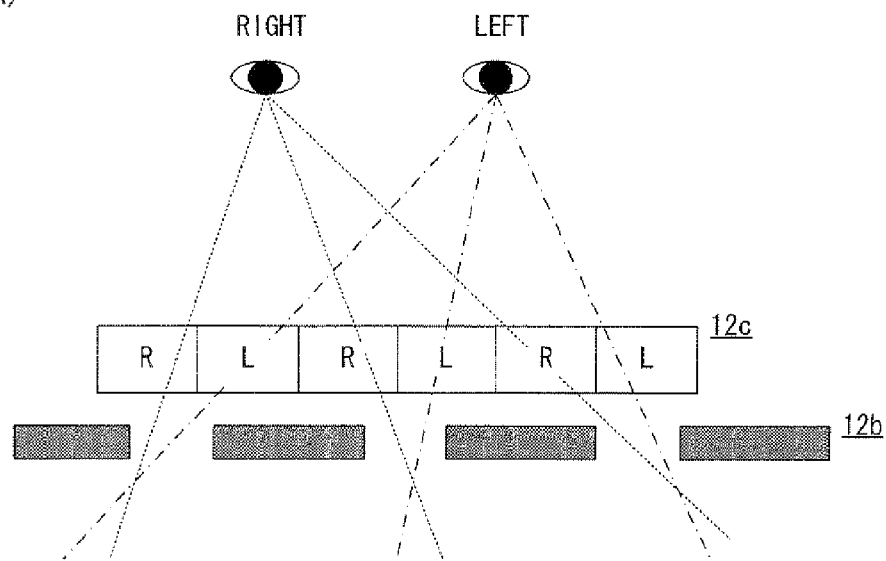
(B)
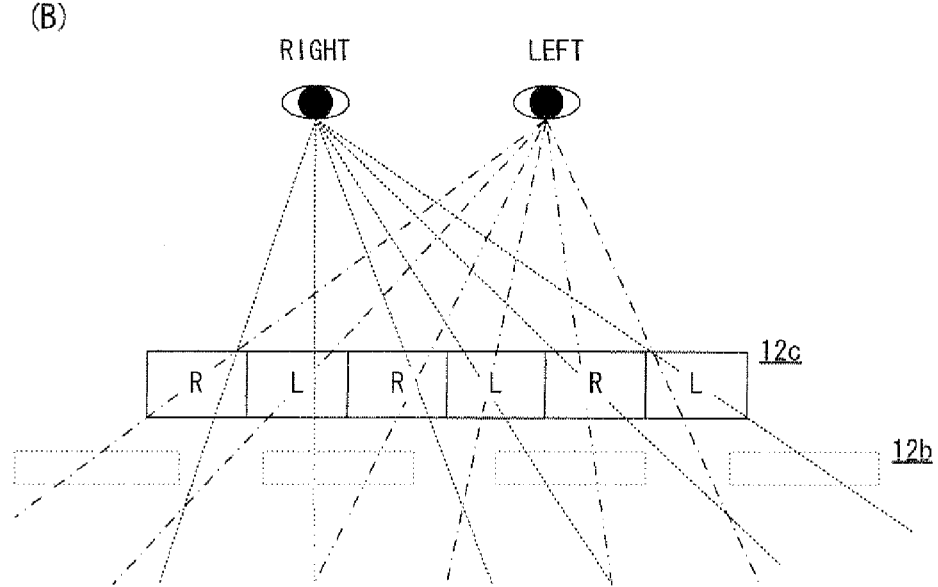

FIG. 7
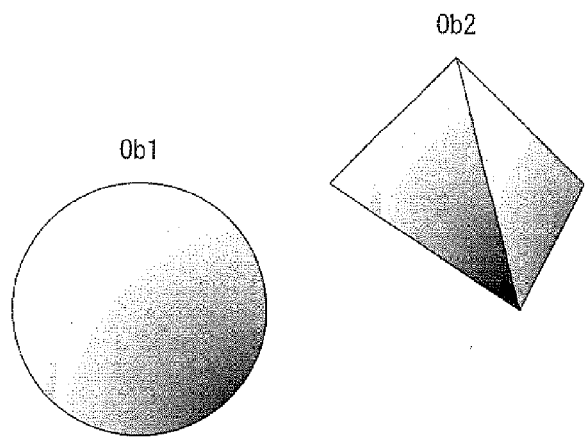
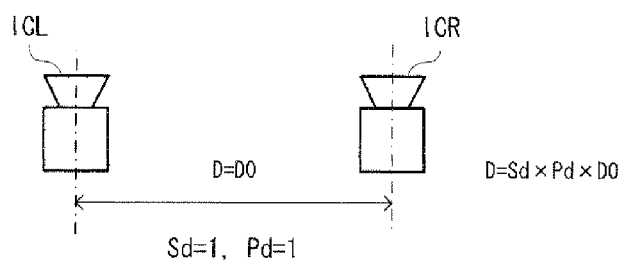
FIG. 8
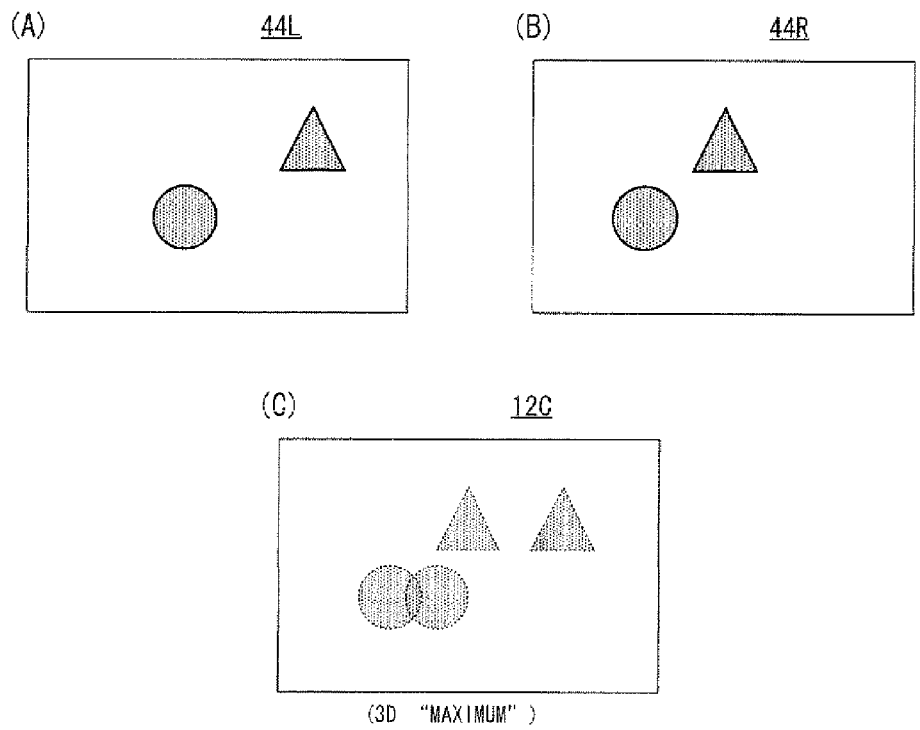

FIG. 9
(A)
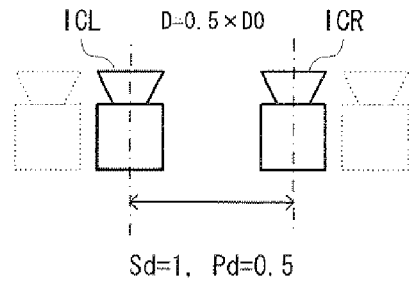
(B)
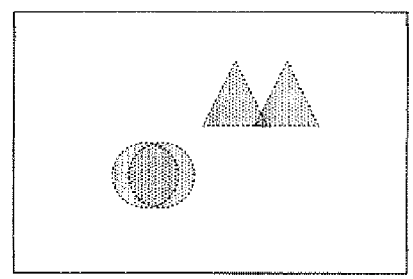
(3D "MIDDLE")
FIG. 10
(A)
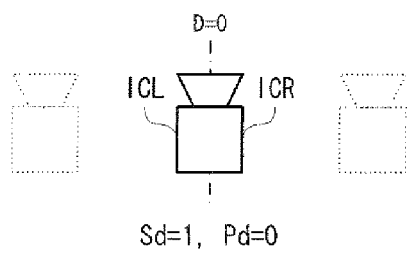
(B)
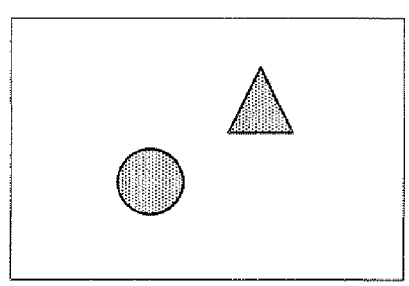
(3D "MINIMUM" = 2D)

STORAGE MEDIUM STORING DISPLAY CONTROLLING PROGRAM, DISPLAY CONTROLLING APPARATUS, DISPLAY CONTROLLING METHOD AND DISPLAY CONTROLLING SYSTEM

CROSS-REFERENCE OF RELATED APPLICATION

The disclosure of Japanese Patent Application No. 2010433905 is incorporated herein by reference.

BACKGROUND OF THE INVENTION

1. Field of the Invention

The present invention relates to a storage medium storing a display controlling program, a display controlling apparatus, a display controlling method and a display controlling system. More specifically, the present invention relates to a storage medium storing a display controlling program, a display controlling apparatus, a display controlling method and a display controlling system which perform a display control on a display capable of making an autostereoscopic display.

2. Description of the Related Art

Conventionally, as an example of this kind of an apparatus, a stereoscopic image displaying apparatus in a parallax barrier system provided with a liquid crystal parallax barrier arranged in front of a liquid crystal display like a Japanese Patent Laid-open No. 3-119889 is known. In the related art, a voltage applied to the liquid crystal parallax barrier is controlled so as to change the transmittance at a light shielding portion, to thereby switch between a 2D video display and a 3D video display.

Generally, a suitable viewing position of the autostereoscopic display is restricted, and if a user is off the suitable viewing position, a 3D video image looks double or blurred without being viewed in a three-dimensional manner. For example, if a display is made as in environmental software, the user can browse both within and outside the suitable viewing position while freely moving, resulting in a problem.

In that respect, in the related art, a 3D display is performed at the suitable viewing position, and a 2D display is performed at a position except for the suitable viewing position, and thus, the user can browse comfortably in any position, but the user has to manually switch between the 2D display and the 3D display every movement, resulting in much labor.

SUMMARY OF THE INVENTION

Therefore, it is a primary object of the present invention to provide a novel storage medium storing a display controlling program, a novel display controlling apparatus, a novel display controlling method and a novel display controlling system.

Another object of the present invention is to provide a storage medium storing a display controlling program, a display controlling apparatus, a display controlling method and a display controlling system that are able to automatically switch between a 3D display and a 2D display.

The present invention adopts the following configuration in order to solve the aforementioned problem.

A first aspect is a storage medium storing a display controlling program to be executed by a computer of a display controlling apparatus that makes a display on an autostereoscopic displayable display, wherein the display controlling program causes the computer to function as: a stereoscopic displayer which makes a stereoscopic display on the display by utilizing a predetermined stereoscopic image; a planar displayer which makes a planar display on the display by utilizing a predetermined planar image; an input accepter which accepts an input from a predetermined input device; and a display switcher which switches from the display by the stereoscopic displayer to the display by the planar displayer in a case that a state that no input is made from the input device to the input accepter continues past a predetermined time period during the display by the stereoscopic displayer.

In the first aspect, a display controlling apparatus displays a virtual space on an autostereoscopic displayable display. A stereoscopic displayer makes a stereoscopic display on the display, and a planar displayer makes a planar display on the display. An input accepter accepts an input from a predetermined input device. A display switcher switches the display by the stereoscopic displayer to the display by the planar displayer in a case that a state that no input is made from the input device to the input accepter continues past a predetermined time period during the display by the stereoscopic displayer.

According to the first aspect, in a case there is not input past a predetermined time period during the stereoscopic image display (3D display), it is possible to automatically switch from the stereoscopic image display (3D display) to the planar image display (2D display).

A second aspect is according to the first aspect, wherein the display controlling apparatus is for displaying a virtual space on the display, the display controlling program causes the computer to further function as: a virtual imager which can image a stereoscopic image for displaying an object in a three-dimensional manner and a planar image for displaying the object in a two-dimensional manner in the virtual space, wherein the stereoscopic displayer makes a stereoscopic display on the display by utilizing the stereoscopic image imaged by the virtual imager, the planar displayer makes a planar display on the display by utilizing the planar image imaged by the virtual imager.

In the second aspect, a virtual imager images a stereoscopic image for displaying an object in a three-dimensional manner and/or a planar image for displaying the object in a two-dimensional manner in the virtual space. The stereoscopic displayer makes a stereoscopic display by utilizing the stereoscopic image imaged by the virtual imager, and the planar displayer makes a planar display by utilizing the planar image imaged by the virtual imager.

According to the second aspect, by utilizing the stereoscopic image (3D image) and/or the planar image (2D image) imaged within the virtual space, it is possible to switch the display.

A third aspect is according to the second aspect, wherein the virtual imager images a left image and a right image by a left virtual camera and a right virtual camera arranged at a predetermined space within the virtual space such that the object is included in an imaging range of the left virtual camera and/or the right virtual camera during the display by the stereoscopic display, and images an image such that the object is included in the imaging range by the predetermined virtual camera within the virtual space when the display by the stereoscopic displayer switches to the display by the planar displayer.

In the third aspect, during the stereoscopic image display (3D display), a left image and a right image are imaged by a left virtual camera and a right virtual camera arranged at a predetermined space within the virtual space such that the object is included in an imaging range of the left virtual camera and/or the right virtual camera during the display by the stereoscopic displayer. At this time, there is a parallax between the left image and the right image. When the stereoscopic image display (3D display) is switched to the planar image display (2D display), imaging is made such that the object is included in the imaging area by the predetermined virtual camera within the virtual space. There is no parallax in this image.

According to the third aspect, by switching among the left virtual camera and the right virtual camera, and the predetermined virtual camera, it is possible to easily switch from the stereoscopic image display (3D display) to the planar image display (2D display).

A fourth aspect is a display controlling program according to the third aspect, wherein the planar displayer displays any one the left image and the right image that are respectively imaged by the left virtual camera and the right virtual camera.

In the fourth aspect, the left image and the right image are equal to each other, and therefore, by displaying any one of them as well, it is possible to make a planar image display (2D display).

A fifth aspect is according to the third aspect, wherein the predetermined virtual camera is positioned midway between the left virtual camera and the right virtual camera.

According to the fifth aspect, the imaging position of the planar image (2D image) is a midway position between the imaging positions of the stereoscopic image (3D image), and therefore, it is possible to reduce uncomfortable feeling at a time when the display is switched.

A sixth aspect is according to the third aspect, wherein the virtual imager performs imaging by moving the left virtual camera and the right virtual camera to a common position in response to a switch from the display by the stereoscopic displayer to the display by the planar displayer.

According to the sixth aspect, by moving the left virtual camera and the right virtual camera to the common position, it is possible to easily switch from the stereoscopic image display (3D display) to the planar image display (2D display).

A seventh aspect is according to the sixth aspect, wherein the virtual imager images a left image and a right image by the left virtual camera and the right virtual camera spacedly arranged right and left with respect to the object within the virtual space during the display by the stereoscopic displayer.

In the seventh aspect, during the stereoscopic image display (3D display), a left image and a right image are imaged by the left virtual camera and the right virtual camera spacedly arranged right and left with respect to the object within the virtual space. At this time, there is a parallax between the left image and the right image. When the stereoscopic image display (3D display) is switched to the planar image display (2D display), the left virtual camera and the right virtual camera are moved to the common position to make the parallax between the left image and the right image disappear.

According to the seventh aspect, by moving the virtual camera, it is possible to easily switch from the stereoscopic image display (3D display) to the planar image display (2D display).

An eighth aspect is according to the sixth aspect, wherein the planar displayer displays any one of the left image and the right image that are respectively imaged by the left virtual camera and the right virtual camera at the common position.

In the eighth aspect, the left image and the right image are equal to each other, and therefore, by displaying any one of them, it is possible to make a planar image display (2D display).

A ninth aspect is according to the sixth aspect, wherein the planar displayer displays the planar image based on both of the left image and the right image that are respectively imaged by the left virtual camera and the right virtual camera at the common position.

According to the ninth aspect, the left image and the right image are equal to each other, and therefore, on the basis of both of the images, for example, by displaying them to be overlaid with each other, or alternately displaying them on a row-by-row basis, it is possible to make the planar image display (2D display).

A tenth aspect is according to any one of the sixth to ninth aspects, wherein the common position is a position midway between the positions of the left virtual camera and the right virtual camera during the display by the stereoscopic displayer.

According to the tenth aspect, the imaging position of the planar image (2D image) is a midway position between the imaging positions of the stereoscopic image (3D image), and therefore, it is possible to reduce uncomfortable feeling when the display is switched.

An eleventh aspect is according to the tenth aspect, wherein the virtual imager gradually moves the left virtual camera and the right virtual camera to the midway position.

In the eleventh aspect, by gradually moving the left virtual camera and the right virtual camera, it is possible to smoothly switch the display.

Additionally, the virtual imager instantaneously moves the left virtual camera and the right virtual camera to the midway position.

A twelfth aspect is according to the eleventh aspect, wherein the virtual imager moves the left virtual camera and the right virtual camera toward the midway position at a uniform velocity.

In the twelfth aspect, by making the moving velocity uniform, it is possible to smoothly switch the display.

A thirteenth aspect is according to the first aspect, wherein the display switcher further switches from the display by the planar displayer to the display by the stereoscopic displayer in a case that there is an input from the input device to the input accepter during the display by the planar displayer.

In the thirteenth aspect, if there is an input during the planar image display (2D display), it is possible to automatically switch from the planar image display (2D display) to the stereoscopic image display (3D display).

A fourteenth aspect is according to the seventh aspect, wherein the virtual imager moves right and left the left virtual camera and the right virtual camera that are placed at the common position with respect to the object in response to a switch from the display by the planar displayer to the display by the stereoscopic displayer.

In the fourteenth aspect, in response to a switch from the planar image display (2D display) to the stereoscopic image display (3D display), the left virtual camera and the right virtual camera are respectively moved left and right, and therefore, parallax occurs between the left image and the right image to change the planar image (2D image) to the stereoscopic image (3D image).

According to the fourteenth aspect, by moving the virtual camera, it is possible to easily switch from the planar image display (2D display) to the stereoscopic image display (3D display).

A fifteenth aspect is according to the second aspect, wherein the virtual imager images a stereoscopic image which can display an object in a three-dimensional manner and a planar image which can display the object in a two-dimensional manner within the virtual space, and the display controlling program causes the computer to further function as an object controller which controls the object within the virtual space in response to an input accepted by the input acceptor.

In the fifteenth aspect, the object in the virtual space is moved or deformed, and so forth according to an input from the input device.

According to the fifteenth aspect, the switch between the planar image display (2D display) and the stereoscopic image display (3D display) can be performed in association with an interactive input for controlling an object.

A sixteenth aspect is according to the fifteenth aspect, wherein the object controller automatically moves the object within the virtual space, and controls, when an input is accepted by the input accepter, the object in response to the input.

According to the sixteenth aspect, it is possible to perform an interactive virtual game in which in a case that there is no input from the input device, the object is automatically moved, and in a case that there is an input from the input device, the object is moved in correspondence with an input.

A seventeenth aspect is according to the fifteenth aspect, wherein the input device includes a manually operation input device, and the input accepter includes a manually operation input accepter which accepts a manually operation input from the manually operation input device.

In the seventeenth aspect, switching the display is made in association with a manually operation input for controlling an object.

An eighteenth aspect is according to any one of the fifteenth to the seventeenth aspects, wherein the input device includes a sound input device, and the input accepter includes a sound input accepter which accepts a sound input from the sound input device.

In the eighteenth aspect, switching the display is performed in association with a sound input for controlling an object.

A nineteenth aspect is according to any one of the fifteenth to eighteenth aspects, wherein the input device includes an image input device, and the input accepter includes an image input accepter which accepts an image input from the image input device.

In the nineteenth aspect, switching the display is performed in association with an image input for controlling an object.

A twentieth aspect is according to any one of the fifteenth to nineteenth aspects, wherein the input device includes a motion input device, and the input accepter includes a motion input accepter which accepts a motion input from the motion input device.

In the twentieth aspect, switching the display is performed in association with a motion input for controlling an object.

A twenty-first aspect is according to any one of the seventeenth to twentieth aspects, wherein the display switcher detects a state that there is no input from any of the inputter as the non-input state.

In the twenty-first aspect, a state that an input including one or plurality of manually operation input, sound input, image input and motion input is not detected is regarded as the non-input state.

According to the seventeenth to twenty-first aspects, more specifically, switching the display can be performed in a case that an interactive virtual game, etc. in which a manual operation, a speech voice, an orientation of the face, gazing, a gesture, a movement of the apparatus itself are utilized for controlling an object is executed.

A twenty-second aspect is according to the first aspect, wherein the display controlling apparatus has a manually operation input device, the input accepter includes a manually operation detector which detects a manual operation input by the manually operation inputter, the display switcher regards a state that no manual operation is detected by the manually operation detector as the non-input state.

In the twenty-second aspect, switching the display is performed in association with a manually operation input. The manually operation input, here, may be an input for an object control, and an input except for it, for example, a command input for starting and stopping. In a certain embodiment, the manually operation input device is a touch panel, various buttons (keys), an analog pad, etc.

According to the twenty-second aspect, it is possible to switch the display in association with the manually operation input.

A twenty-third aspect is according to the first aspect, wherein the display controlling apparatus has a sound input device, the input accepter includes a speech voice detector which detects a speech voice from the sound input by the sound inputter, and the display switcher regards a state that no speech voice is detected by the speech voice detector as the non-input state.

In the twenty-third aspect, switching the display is performed in association with a sound input. The sound input, here, may be an input for an object control, and an input except for it, for example, a command input for starting and stopping.

According to the twenty-third aspect, it becomes possible to switch the display in association with the sound input.

A twenty-fourth aspect is according to the twenty-third aspect, wherein the display switcher regards a state that no speech voice larger in level than a threshold value is detected as the non-input state.

According to the twenty-fourth aspect, it is possible to reduce a malfunction due to a speech voice of a human other than the user.

A twenty-fifth aspect is according to the first aspect, wherein the display controlling apparatus is provided with an imaging device, the input accepter includes a face detector which detects a facial image from the imaged image imaged by the imaging device, and the display switcher regards a state that no facial image is detected by the face detector as the non-input state.

In the twenty-fifth aspect, switching the display is performed in association with an image input. The image input, here, may be an input for an object control, and an input except for it, for example, a command input for starting and stopping.

According to the twenty-fifth aspect, it becomes possible to switch the display in association with an image input.

A twenty-sixth aspect is according to the twenty-fifth aspect, wherein the display switcher regards a state that no facial image larger in size than a threshold value is detected as the non-input state.

According to the twenty-sixth aspect, it is possible to reduce a malfunction due to a face of a human other than the user.

A twenty-seventh aspect is according to the first aspect, wherein the display controlling apparatus is provided with a motion sensor, the input accepter includes a motion detector which detects a motion of the display controlling apparatus by the motion sensor, and the display switcher regards a state that no motion larger than a threshold value is detected by the motion detector as the non-input state.

In the twenty-seventh aspect, switching the display is performed in association with the motion input. The motion input, here, may be an input for an object control, and an input except for it, for example, a command input for starting and stopping.

According to the twenty-seventh aspect, it becomes possible to switch the display in association with the motion input.

A twenty-eighth aspect is according to the first aspect, wherein the display is an autostereoscopic displayable display by a parallax barrier, the display controlling program causes the computer to further function as: a voltage applying controller which applies a voltage to the parallax barrier in a case that a stereoscopic display is performed on the display by the stereoscopic displayer, and does not apply a voltage to the parallax barrier in a case that a planar display is performed on the display by the planar displayer.

In the twenty-eighth aspect, the stereoscopic image display (3D display) is performed by utilizing the parallax barrier. The switch between the stereoscopic image display (3D display) and the planar image display (2D display) is implemented by turning on/off the voltage applied to the parallax barrier.

It should be noted that in a certain embodiment, the parallax barrier is a barrier liquid crystal, and the LCD controller controls a voltage applied to the barrier liquid crystal to thereby turn the barrier liquid crystal on/off, that is, make it opaque/transparent. The parallax barrier can be made of any materials without being restricted to the liquid crystal if only the materials become opaque/transparent in response to the applied voltage.

According to the twenty-eighth aspect, by utilizing the parallax barrier, the stereoscopic image display (3D display) can be performed, and when the stereoscopic image display (3D display) switches to the planar image display (2D display), the parallax barrier is turned off (the barrier liquid crystal is made transparent, for example) to thereby extend a suitable viewing position or increase the brightness.

It should be noted that the stereoscopic image display (3D display), that is, the autostereoscopic display can be implemented by a system other than the parallax barrier, such as a lenticular (sheet with concaves/convexes) system, for example. In addition, the switch from the stereoscopic image display (3D display) to the planar image display (2D display), that is, switching to the planar display can be implemented by a system other than the parallax barrier, such as a lenticular (sheet with concaves/convexes) system. It should be noted that in a case of the lenticular, for example, when the stereoscopic image display (3D display) switches to the planar image display (2D display), it is difficult to extend the suitable viewing position and increase the brightness.

A twenty-ninth aspect is a display controlling program to be executed by a computer of a display controlling apparatus that makes a display on an autostereoscopic displayable display, wherein the display controlling apparatus is provided with an imaging device, the display controlling program causes the computer to function as: a stereoscopic displayer which makes a stereoscopic display on the display by utilizing a predetermined stereoscopic image; a planar displayer which makes a planar display on the display by utilizing a predetermined planar image; a face detector which detects a facial image from an imaged image imaged by the imaging device; and a display switcher which switches from the display by the stereoscopic displayer to the display by the planar displayer in a case that a state no facial image is detected by the face detector continues past a predetermined time period during the display by the stereoscopic displayer.

According to the twenty-ninth aspect, in a case that no facial image is detected past the predetermined time period during the stereoscopic image display (3D display), the stereoscopic image display (3D display) can be automatically switched to the planar image display (2D display).

A thirtieth aspect is a display controlling apparatus making a display on an autostereoscopic displayable display, wherein a stereoscopic displayer which makes a stereoscopic display on the display by utilizing a predetermined stereoscopic image; a planar displayer which makes a planar display on the display by utilizing a predetermined planar image; an input accepter which accepts an input from a predetermined input device; and a display switcher which switches from the display by the stereoscopic displayer to the display by the planar displayer in a case that a state that no input is made from the input device to the input accepter continues past a predetermined time period during the display by the stereoscopic displayer.

A thirty-first aspect is a display controlling method by a display controlling apparatus making a display on an autostereoscopic displayable display, including following steps of: a stereoscopic displaying step for making a stereoscopic display on the display by utilizing a predetermined stereoscopic image; a planar displaying step for making a planar display on the display by utilizing a predetermined planar image; an input accepting step for accepting an input from a predetermined input device; and a display switching step for switching from the display by the stereoscopic displaying step to the display by the planar displaying step in a case that a non-input state from the input device to the input accepting step continues past a predetermined time period during the display by the stereoscopic displaying step.

A thirty-second aspect is a display controlling system making a display on an autostereoscopic displayable display, wherein a stereoscopic displayer which makes a stereoscopic display on the display by utilizing a predetermined stereoscopic image; a planar displayer which makes a planar display on the display by utilizing a predetermined planar image; an input accepter which accepts an input from a predetermined input device; and a display switcher which switches from the display by the stereoscopic displayer to the display by the planar displayer in a case that a state that no input is made from the input device to the input accepter continues past a predetermined time period during the display by the stereoscopic displayer.

In each of the thirtieth to thirty-second aspects as well, similar to the first aspect, in a case there is not input past a predetermined time period during the stereoscopic image display (3D display), it is possible to automatically switch from the stereoscopic image display (3D display) to the planar image display (2D display).

A thirty-third aspect is a display controlling apparatus making a display on an autostereoscopic displayable display, comprising: an imaging device; a stereoscopic displayer which makes a stereoscopic display on the display by utilizing a predetermined stereoscopic image; a planar displayer which makes a planar display on the display by utilizing a predetermined planar image; a face detector which detects a facial image from an imaged image imaged by the imaging device; and a display switcher which switches from the display by the stereoscopic displayer to the display by the planar displayer in a case that a state that no facial image is detected by the face detector continues past predetermined time period during the display by the stereoscopic displayer.

A thirty-fourth aspect is a display controlling method by a display controlling apparatus making a display on an autostereoscopic displayable display, wherein the display controlling apparatus is provided with an imaging device; including following steps of: a stereoscopic displaying step for making a stereoscopic display on the display by utilizing a predetermined stereoscopic image; a planar displaying step for making a planar display on the display by utilizing a predetermined planar image; a face detecting step for detecting a facial image from an imaged image imaged by the imaging device; and a display switching step which switches from the display by the stereoscopic displaying step to the display by the planar displaying step in a case that a state that no facial image is detected by the face detecting step continues past a predetermined time period during the display by the stereoscopic displaying step.

A thirty-fifth aspect is display controlling system making a display on an autostereoscopic displayable display, comprising: an imaging device; a stereoscopic displayer which makes a stereoscopic display on the display by utilizing a predetermined stereoscopic image; a planar displayer which makes a planar display on the display by utilizing a predetermined planar image; a face detector which detects a facial image from an imaged image imaged by the imaging device; and a display switcher which switches from the display by the stereoscopic displayer to the display by the planar displayer in a case that a state that no facial image is detected by the face detector continues past a predetermined time period during the display by the stereoscopic displayer.

In each of the thirty-third to thirty-fifth aspects, similar to the twenty-ninth aspect, in a case that no facial image is detected past the predetermined time period during the stereoscopic image display (3D display), the stereoscopic image display (3D display) can be automatically switched to the planar image display (2D display).

According to the present invention, it is possible to automatically switch between the stereoscopic image display (3D display) and the planar image display (2D display). This saves the user from having to make a switch, capable of enhancing customer convenience.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an external view of the game apparatus, FIG. 2 (A) shows a top surface in a close state, FIG. 2 (B) shows a left side surface in the close state, FIG. 2 (C) is a front surface in the close state, FIG. 2 (D) is a right side surface in the close state, FIG. 2 (E) shows a back surface in the close state, and FIG. 2 (F) shows a bottom surface in the closed state;

FIG. 3 is an illustrative view for explaining an operation of a 3D adjusting switch;

FIG. 4 is a block diagram showing one example of an electric configuration of the game apparatus;

FIG. 6 is an illustrative view for explaining a principle of a 3D/2D display in a parallax barrier system, FIG. 6(A) shows a state that a parallax barrier is turned on (3D display), and FIG. 6(B) shows a state that a parallax barrier is turned off (2D display);

FIG. 7 is an illustrative view showing a situation in which an object is imaged by right and left two virtual cameras in a virtual space;

FIG. 8 is an illustrative view showing an imaged image (the distance-between cameras is a maximum value D0) by the two virtual cameras, FIG. 8(A) shows a left image of a VRAM, FIG. 8(B) shows a right image of the VRAM, and FIG. 8(C) shows a stereoscopic image (3D up to maximum of) on an upper LCD;

FIG. 9 is an illustrative view explaining a change of a stereoscopic image according to a distance-between cameras, FIG. 9(A) shows one example of the distance-between cameras (0.5×D0), and FIG. 9(B) shows a stereoscopic image corresponding to the relevant distance (3D is middle);

FIG. 10 is an illustrative view explaining a 3D adjustment according to the distance-between cameras, FIG. 10(A) shows another example of the distance-between cameras (minimum value 0), and FIG. 10(B) shows a stereoscopic image corresponding to the relevant distance (3D is minimum=2D);

DETAILED DESCRIPTION OF THE PREFERRED EMBODIMENTS

Figure 1:
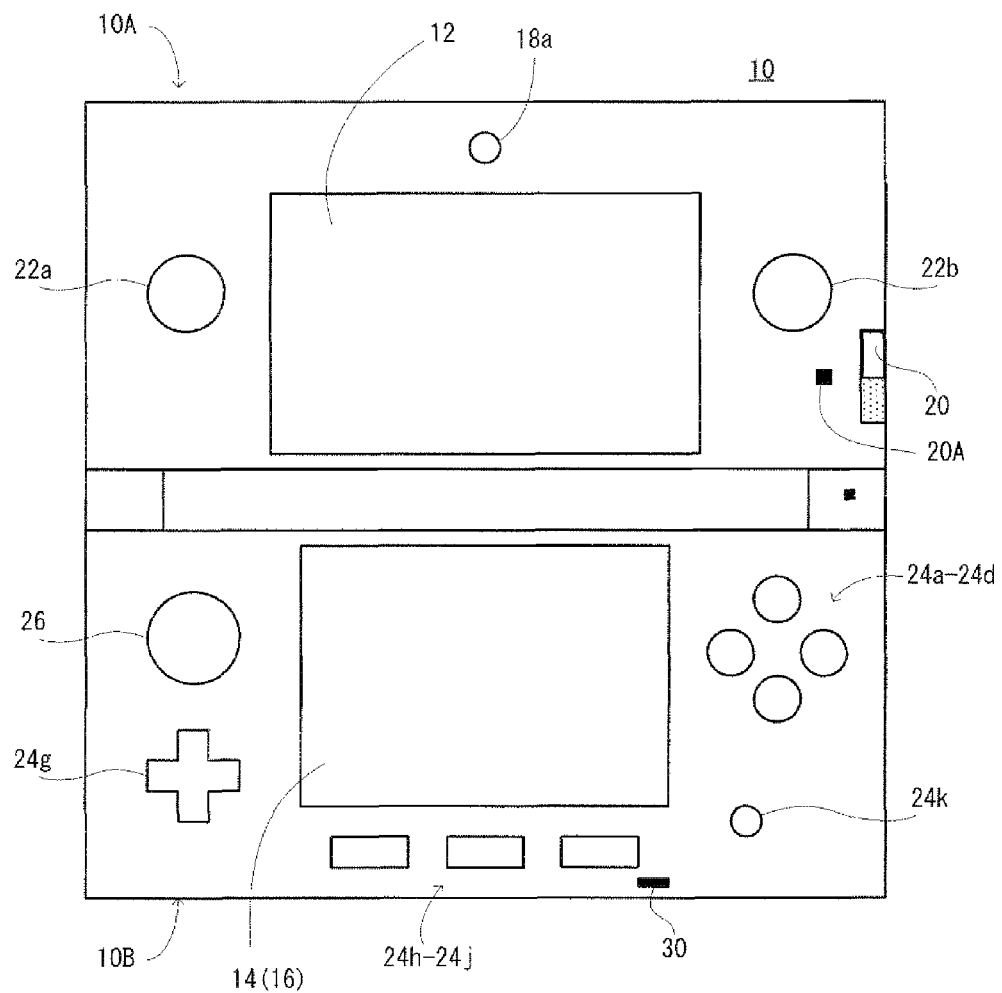
FIG. 1 is an external view of a game apparatus of one embodiment of the present invention, and shows a top surface in an open state.

In FIG. 1 and FIG. 2, an appearance of a game apparatus 10 of one embodiment of the present invention is shown. The game apparatus 10 is a foldable game apparatus, FIG. 1 shows a top view of the game apparatus 10 in an open state, FIG. 2 (A) to FIG. 2 (F) respectively shows a top surface, a left side surface, a front surface, a right side surface, a back surface and a bottom surface of the game apparatus 10 in a closed state.

The game apparatus 10 has an upper housing 10A and a lower housing 10B rotatably connected with each other as shown in FIG. 1, and on a top surface of the upper housing 10A, a stereoscopic LCD 12 compliant with an autostereoscopic display, an inward camera 18a, a 3D adjusting switch 20, a 3D lamp 20A, right and left speakers 22a and 22b, etc. are provided. On a top surface of the lower housing 10B, a lower LCD 14 attached with touch panel 16, A, B, X, Y buttons 24a-24d, a cross key (button) 24g, home, select, start buttons 24h-24j, a power button 24k, an analog pad 26, and a microphone 30 are provided.

Furthermore, as shown in FIG. 2 (A), on a top surface of the game apparatus 10 (reverse side of the upper housing 10A shown in FIG. 1) in the closed state, right and left outward cameras 18b and 18c compliant with 3D imaging are provided. Furthermore, as shown in FIG. 2 (C), on a front surface of the game apparatus 10, a headphone terminal 36, a power lamp 42a, etc. are provided. Also, as shown in FIG. 2 (B), FIG. 2 (E) and FIG. 2 (D), from a left side surface to a back surface of the game apparatus 10, an L button 24e is provided, and from a right side surface to a back surface, an R button 24f is provided. Moreover, on the left side surface of the game apparatus 10, a volume control switch 32, an SD card slot 34, etc. are provided, and on the right side surface of the game apparatus 10, a wireless switch 28, a wireless lamp 42b, etc. are provided. The above-described 3D adjusting switch is exposed from the right side surface. In addition, on the back surface of the game apparatus 10, an infrared ray emitting-receiving portion 40, etc. is provided. Then, as shown in FIG. 2 (E) and FIG. 2 (F), from the back surface to a bottom surface, a game card slot 38 is provided.

The stereoscopic LCD 12 is a 3D liquid crystal (see FIG. 6) according to a parallax barrier system, and displays a stereoscopic image without any glasses (autostereoscopic image). On the stereoscopic LCD 12, by turning a parallax barrier of the liquid crystal off, a planar image display is also made possible. It should be noted that a lenticular system utilizing a sheet with concaves/convexes (lenticular lens) and other autostereocopic 3D systems may be adopted without being restricted to the parallax barrier system.

The inward camera 18a images a planar image (2D image) while the outward cameras 18b and 18c image stereoscopic images (3D image). A 2D or 3D image imaging the player can be used as an image input to a game program (72: described later). In this case, the game program 72 detects movements of a face, a hand and a gazing direction (direction of eyeballs) of the player by performing image recognition, and executes processing corresponding to the detection result. The 2D image by the inward camera 18a can be displayed on the lower LCD 14, and the 3D images by the outward cameras 18b and 18c can be displayed on the stereoscopic LCD 12.

The 3D adjusting switch 20 manually switches the display of the stereoscopic LCD 12 between the 3D display and the 2D display, and is a slide switch for manually adjusting a three-dimensional effect in the 3D display as well and operates as shown in FIG. 3, for example. The three-dimensional effect of the 3D display becomes a maximum (Sd=1) when the slider Sd is at an upper end, decrease as the slider Sd is moved down, and becomes a minimum (Sd=0) when at a lower end in this embodiment. Then, the 3D display changes to the 2D display when the slider Sd is moved down.

Although the detailed description is made later, such a change of the three-dimensional effect of the 3D display is implemented by changing the distance (distance-between cameras D) between the right and left virtual cameras (ICL and ICR: see FIG. 7) arranged within the virtual space (see FIG. 7-FIG. 10). That is, according to an operation of the 3D adjusting switch 20, the distance-between cameras D is adjusted. Then, the distance-between cameras D receives an automatic adjustment (described later) by the game program 72 as well as the manual adjustment.

The 3D lamp 20A is a lamp showing a displaying condition of the stereoscopic LCD 12, and lights up in the 3D display and light off in the 2D display. Here, it may be changed in brightness and color in correspondence with the degree of the 3D display (intensity of the three-dimensional effect) as well as it merely lights up and off.

An operation to the touch panel 16, the A, B, X, Y buttons 24a-24d, the cross key (button) 24g, the home, select, start buttons 24h-24j, or the analog pad 26 is used as a touch/button/pad input to the game program 72. The power button 24k is used for turning on or off the power of the game apparatus 10. The power lamp 42a lights up or off in conjunction with the power-on or the power-off of the power source.

The microphone 30 converts a user speech voice, an environmental sound, etc. to sound data. The sound data can be used as a sound input to the game program 72. In this case, the game program 72 detects the speech voice by the player by performing voice recognition, and executes processing according to the detection result. The sound data by the microphone 30 can be further recorded in a NAND-type flash memory 48 (see FIG. 4), etc.

The speakers 22a and 22b output a game voice, a microphone voice, etc. To the headphone terminal 36, a headphone not shown is connected. The volume control switch 32 is a slide switch for adjusting volumes of the speakers 22a and 22b or an output from the headphone terminal 36.

The SD card slot 34 is attached with an SD memory card (not illustrated) for storing a camera image, a microphone sound, etc., and the game card slot 38 is attached with a game card (not illustrated) storing the game program 72, etc. The infrared ray emitting-receiving portion 40 is utilized for infrared rays (IR) communications with another game apparatus.

FIG. 4 shows an electric configuration of the game apparatus 10. The game apparatus 10 includes an SoC (System-on-a-Chip) 44 being made up of a CPU, a GPU, a VRAM, a DSP, etc. The SoC 44 is connected with the above-described stereoscopic LCD 12, lower LCD 14, inward camera (In camera) 18a, right and left outward cameras (OCAM-L and OCAM-R) 18b and 18c, A, B, X, Y, L, R buttons 24a-24f, cross button 24g, SD card slot 34, game card slot 38, and infrared ray emitting-receiving portion (IR) 40. The SoC 44 is further connected with the above-described 3D adjusting switch (3D Vol) 20, 3D lamp 20A, home, select, start buttons 24h-24j, power button (Power) 24k, wireless switch (WiFi) 28, volume control switch (volume Vol) 32, and power, wireless lamps 42a, 42b via a microcomputer (hereinafter referred to as "micon") 56. The SoC 44 is moreover connected with the above-described touch panel 16, right and left speakers 22a and 22b, analog pad 26, microphone (Mic) 30 and headphone terminal 36 via an IF circuit 58.

In addition, the SoC 44 is connected with a wireless module 46, the NAND-type flash memory 48 and a main memory 50 as elements other than the above description. The wireless module 46 has a function of connecting to a wireless LAN. The NAND-type flash memory 48 stores data for saved, such as a camera image, a microphone voice, etc. The main memory 50 gives a working area to the SoC 44. That is, in the main memory 50, various data and programs to be used in the game are stored, and the SoC 44 performs works by utilizing the data and program stored in the main memory 50.

The micon 56 is connected with a power source management IC 52 and an acceleration sensor 54. The power source management IC 52 performs a power source management of the game apparatus 10, and the acceleration sensor 54 detects accelerations in the three-axis directions of the game apparatus 10. The detection result of the acceleration sensor 54 can be used as a motion input to the game program 72. In this case, the game program 72 calculates a motion of the game apparatus 10 itself on the basis of the detection result, and executes processing according to the calculation result. Furthermore, the micon 56 includes an RTC (real-time clock) 56a, and counts a time by the RTC 56a to supply the same to the SoC 44.

Figure 5:
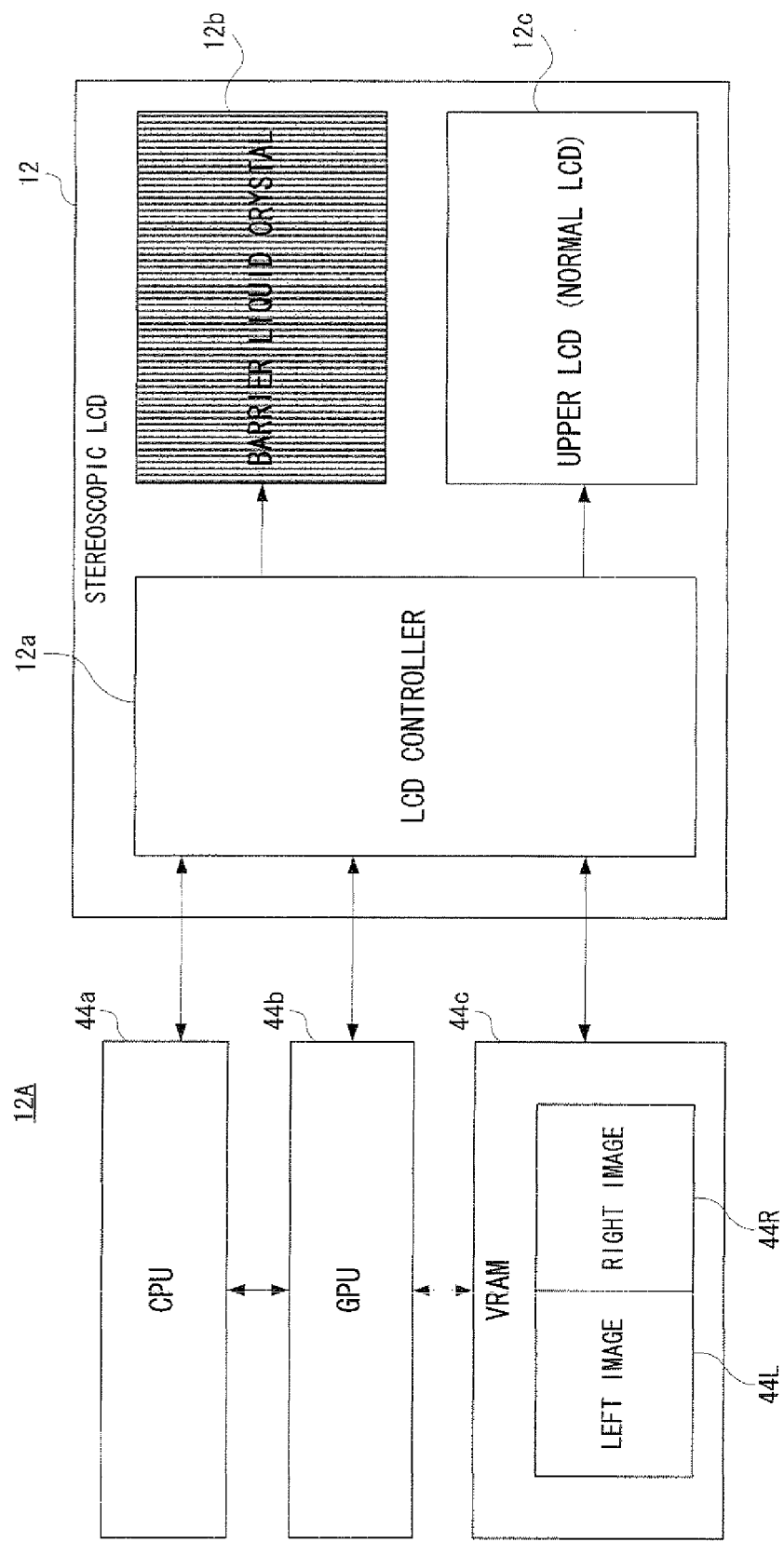
FIG. 5 is a block diagram showing a main part (stereoscopic LCD controller being formed of a stereoscopic LCD and a part of SOc) of the electric configuration in FIG. 4.

FIG. 5 shows a stereoscopic LCD controller 12A being made up of the stereoscopic LCD 12 and a part of the SOc 44. The stereoscopic LCD 12 includes an LCD controller 12a, a barrier liquid crystal 12b and an upper LCD 12c. The barrier liquid crystal 12b includes a plurality of liquid crystal slits extending in a vertical (row) direction as shown in FIG. 6(A), and makes the right eye and the left eye view beams passing through pixels in a different row of the upper LCD 12c by alternately cutting off the beam from the backlight by the plurality of liquid crystal slits. The upper LCD 12c may be a general liquid crystal (for 2D display) similar to the lower LCD 14. The LCD controller 12a performs drawing on the upper LCD 12c under the control of the GPU 44b and then the CPU 44a, and turns the barrier liquid crystal 12b (applied voltage) on and off. When the barrier liquid crystal 12b is turned off, the right eye and the left eye can view the beams passing through the pixels of all the rows on the upper LCD 12c as shown in FIG. 6(B).

More specifically, as shown in FIG. 7, in a case that objects Ob1 and Ob2 are imaged by a left virtual camera ICL and a right virtual camera ICR spacedly arranged right and left (D=D0) within the virtual space, the GPU 44b writes a left image 44L and a right image 44R as shown in FIG. 8(A) and FIG. 8(B) to the VRAM 44c, and the LCD controller 12a alternately reads the left image 44L and the right image 44R stored in the VRAM 44c on a row-by-row basis, and draws them in the upper LCD 12c in order under the control of the CPU 44a. Thus, on the upper LCD 12c, a stereoscopic image (for implementing a stereoscopic views) as shown in FIG. 8(C) is displayed. When a backlight beam to the stereoscopic image is limited by the barrier liquid crystal 12b, the left eye can view the left image 44L as shown in FIG. 8(A), and the right eye can view the right image 44R as shown in FIG. 8(B), so that autostereoscopy is implemented.

By the way, as described above, the stereoscopic image in FIG. 8(C) is an image when the distance-between cameras D becomes the maximum (D=D0: see FIG. 7), and it changes from FIG. 9(B) to FIG. 10(B) as the distance-between cameras D is shorter from FIG. 9(A) to FIG. 10(A). The distance-between cameras D is calculated according to the following equation (1).

$$D = Sd \times Pd \times D0 \quad (1)$$

Here, Sd is a variable showing a value of the slider Sd of the 3D adjusting switch 20 shown in FIG. 3, and changes within a range from 0 to 1 in accordance with an operation of the slider Sd ($0 \leq Sd \leq 1$). Pd is a variable to be controlled by the game program 72, and similarly changes within a range from 0 to 1 ($0 \leq Pd \leq 1$). D0 is a constant corresponding to a space between the two pupils of the human, and is set to 65 mm, for example (D0=65 mm).

In each of FIG. 7, FIG. 9(A) and FIG. 10(A), the variable Sd is 1, and the slider Sd is fixed at the upper end (Sd=1). The variable Pd changes as in 1→0.5→0 by the game program 72, so that the distance-between cameras D changes as in D0→(0.5×D0)→0. Then, in correspondence with the change in a direction in which the distance-between cameras D is decreased, the stereoscopic image changes as in FIG. 8(C) →FIG. 9(B)→FIG. 10(B). That is, the parallax between the left image 44L and the right image 44R decreases, and becomes equal to the planar image.

Here, if the variable Sd is fixed at 0.5 (Sd=0.5), the distance-between cameras D changes within the range from 0 to (0.5×D0). Furthermore, if the variable Sd is fixed at 0 (Sd=0), the distance-between cameras D remains 0.

In a case of a state in FIG. 10(A), that is, in a case of the minimum of the 3D display or in a case of the 2D display, the distance-between cameras D becomes 0, so that the left image 44L and the right image 44R which are written to the VRAM 44c become the same (that is, the parallax is 0). In this case as well, the LCD controller 12a alternately reads the left image 44L and the right image 44R stored in the VRAM 44c on a row-by-row basis, and draws them in the upper LCD 12c in order. Thus, a planar image (that is, image without parallax) as shown in FIG. 10(B) is displayed on the upper LCD 12c. When the barrier liquid crystal 12b for restricting the backlight to the stereoscopic image is turned off, the right and left eyes can view the planar image shown in FIG. 10(B).

Here, even if the barrier liquid crystal 12b is not turned off at this time, the planar image shown in FIG. 10(B) can still be viewed. It should be noted that when the barrier liquid crystal 12b is turned off, a suitable viewing position is extended to make the planar image appear bright. Furthermore, the LCD controller 12a may read only one of the left image 44L and the right image 44R in place of alternately reading them to draw it in the upper LCD 12c. In this case as well, the planar image as shown in FIG. 10(B) is displayed on the upper LCD 12c.

Figure 11:
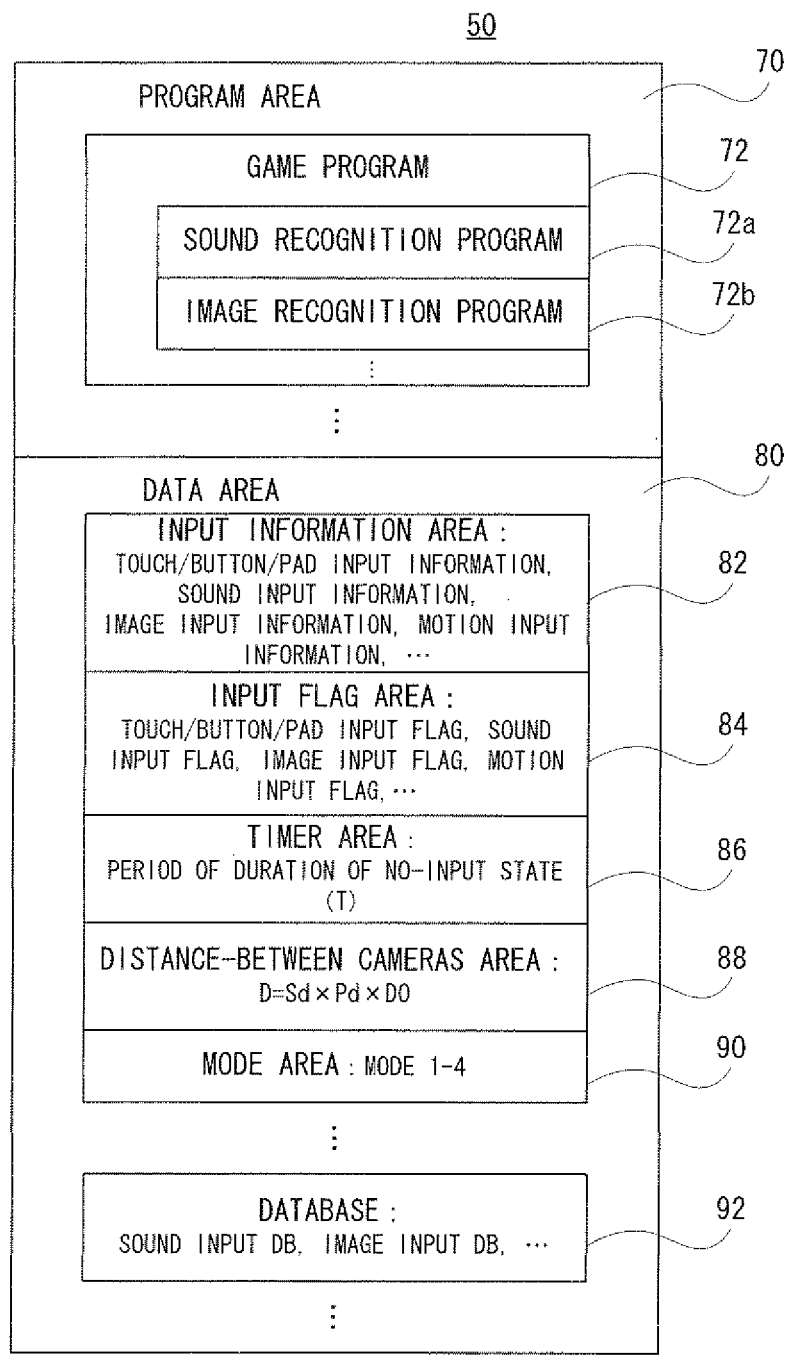
FIG. 11 is an illustrative view showing a part of a memory map of a main memory.

The aforementioned operation is implemented by executing the processing shown in FIG. 12 to FIG. 17 on the basis of the program and data shown in FIG. 11 stored in the main memory 50 by the CPU 44a making up of the stereoscopic LCD controller 12A in conjunction with the GPU 44b and the LCD controller 12a.

Referring to FIG. 11, the main memory 50 is formed with a program area 70 and a data area 80, and in the program area 70, the game program 72 is stored. The game program 72 includes a sound recognition program 72a, an image recognition program 72b, etc. In the data area 80, an input information area 82, an input flag area 84, a timer area 86, a distance-between cameras area 88, a mode area 90, etc. are formed. In the data area 80, a database (DB) 92 to be referred by the game program 72 is also stored. The database 92 includes a sound input DB which stores speech voices of a specific or an average player in association with commands and an image input DB which stores a facial images of a specific or an average player and further stores an orientation of the facial image and a movement of the eyeballs (gazing line), a movement of the lip, etc. included in the facial image in association with commands. Here, the image input DB may include data in relation to the hands (gesture), for example, other than the face (including the eyes, the lip, etc.).

The game program 72 is a main software program for executing processing according to flowcharts shown in FIG. 13-FIG. 16 by controlling various pieces of hardware (12 to 58) via the CPU 44a. The sound recognition program 72a and the image recognition program 72b are sub software programs to be used by the game program 72 in the course of such processing. The sound recognition program 72a recognizes a speech voice by the player by performing sound recognizing processing based on the sound input DB on the sound data input through the microphone 30. The recognition result is written to the input information area 82 as sound input information. The image recognition program 72b recognizes the face of the player by performing image recognition processing based on the image input DB on the image data input through the cameras 18a-18c, and further determines an orientation of the facial image and a movement of the eyeballs (gazing direction), a movement of the lip (speech operation), a movement of the hands (gesture), etc. The result of the recognition or determination is written to the input information area 82 as image input information.

In addition, to the input information area 82, touch/button/pad input information based on an operation by the touch panel 16, the various buttons (keys) 24a-24k or the analog pad 26, and motion input information based on the detection result by the acceleration sensor 54 other than the aforementioned sound input information and image input information are further written.

The input flag area 84 stores an input flag set or reset according to the game program 72. The input flag includes a sound input flag corresponding to sound input information, an image input flag corresponding to image input information, a touch/button/pad input flag corresponding to touch/button/pad input information, and a motion input flag corresponding to motion input information.

The timer area 86 stores a value of a timer (period of duration of a non-input state T) reset or incremented by the game program 72. The distance-between cameras memory area 88 stores the distance (distance-between cameras D=Sd×

PdxD0) between the right and left virtual cameras ICL and ICR to be controlled by the game program 72. The mode area 90 stores mode information to be controlled by the game program 72. The mode information changes among a mode 1 corresponding to a stereoscopy-on state, a mode 2 corresponding to a transition state from the stereoscopy-on state to a stereoscopy-off state, a mode 3 corresponding to the stereoscopy-off state, and a mode 4 corresponding to a transition state from the stereoscopy-off state to the stereoscopy-on state.

Figure 12:
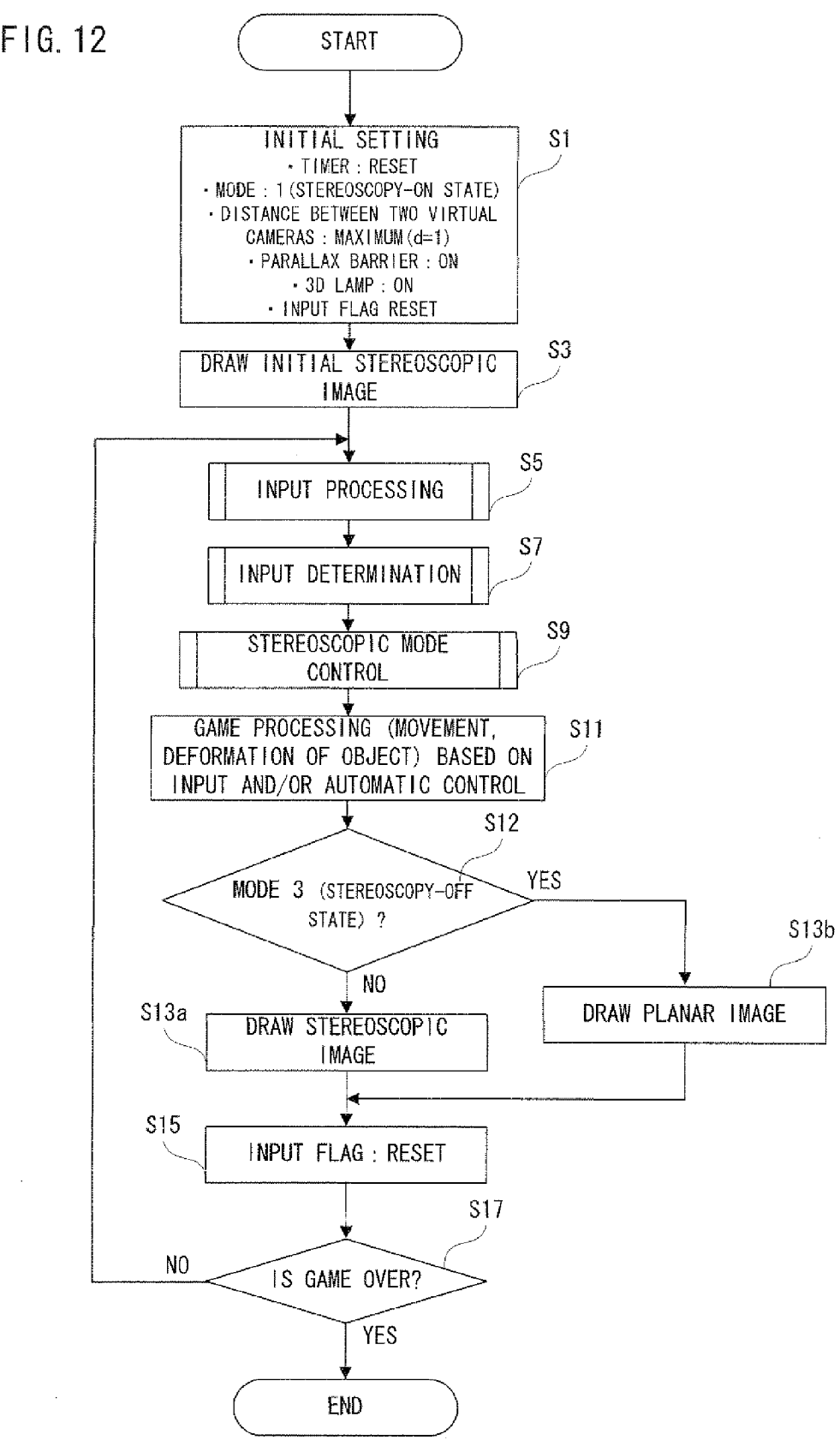
FIG. 12 is a flowchart showing a part of an operation by a CPU.

Referring to FIG. 12, when the game program 72 is activated, the CPU 44a performs an initial setting in a step S1. More specifically, "T=0" is written to the timer area 86 to reset the timer, "1" is written to the mode area 90 to set the mode information to the mode 1, "D=Sd×1×D0" is written to the distance-between cameras memory area 88 to set the distance between the right and left virtual cameras ICL and ICR to the maximum, the barrier liquid crystal 12b is turned on via the LCD controller 12a, the 3D lamp 20A is turned on via the micon 56, and each of the input flags of the input flag area 84 is reset.

It should be noted that in the variable Sd, a current value of the slider Sd (see FIG. 3) is written. The constant D0 is 65 mm, for example. Accordingly, in a case that the position of the slider of the 3D adjusting switch 20 is at the upper end, the distance-between cameras D becomes "1×1×65", that is, 65 mm (see FIG. 7). Alternatively, in a case that the position of the slider is at the 3D minimum or at the lower end (2D), the distance-between cameras D is "0×1×65", that is, 0. In what follows, an explanation is made with the slider Sd at the upper end (Sd=1).

Next, the CPU 44a instructs the GPU 44b and the LCD controller 12a to draw an initial stereoscopic image as to the objects Ob1 and Ob2 shown in FIG. 7, for example. In response thereto, the GPU 44b writes the left image 44L and the right image 44R (FIG. 8(A) and FIG. 8(B)) by the virtual cameras ICL and ICR (D=D0) as shown in FIG. 7 to the VRAM 44c (see FIG. 5). The LCD controller 12a alternately reads the left image 44L and the right image 44R stored in the VRAM 44c on a row-by-row basis, and draws them in the upper LCD 12c in order. Thus, on the upper LCD 12c, the stereoscopic image as shown in FIG. 8(C) is displayed. The backlight beam to the stereoscopic image is restricted by the barrier liquid crystal 12b (see FIG. 6(A)), so that the left eye can view the left image 44L as shown in FIG. 8(A) and the right eye can view the right image 44R as shown in FIG. 8(B), capable of implementing autostereoscopy.

Figure 17:
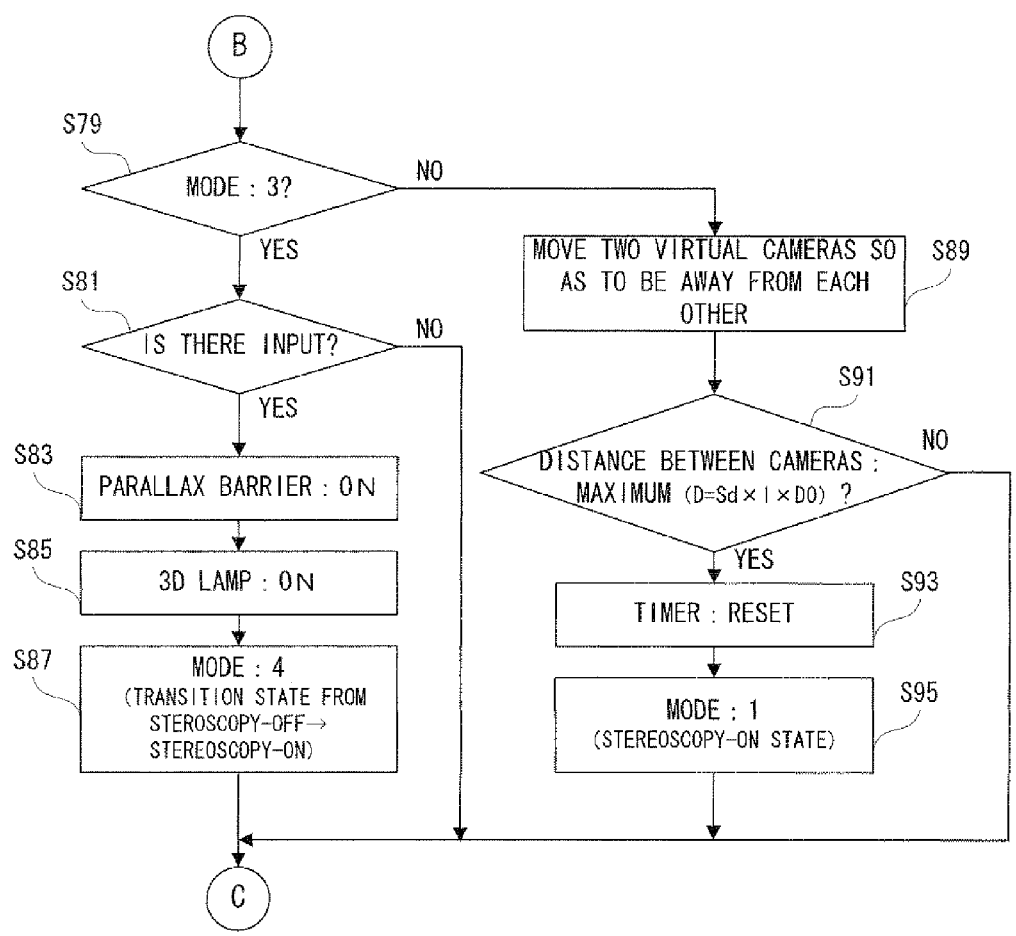
FIG. 17 is a flowchart showing a still another part of the operation by the CPU.

Then, the CPU 44a executes loop processing in steps S5 to S17 every frame until the game is ended. In the step S5, input processing is executed (see FIG. 13: described later), in the step S7, an input determination is performed, and the determination result is reflected on the input flag (see FIG. 14: described later). In the step S9, with reference to the input flag, a stereoscopic mode control is performed (FIG. 15—see FIG. 17: described later). In the step S11, game processing (processing of moving the object Obj1 and deforming the object Obj2 within the virtual space, for example) based on an input and/or an automatic control is executed. Accordingly, the game can be advanced without any input.

In the step S12, it is determined whether or not the mode information of the mode area 90 is the "mode 3", and if "NO", a stereoscopic image is drawn in the step S13a, and then, the process proceeds to the step S15. It should be noted that the drawing processing itself in the step S13a is similar to that of the above-described step S3, but through the mode control in the step S9, the distance-between cameras D changes from FIG. 9(A) to FIG. 10(A), for example, so that the stereoscopic image of the upper LCD 12c changes from FIG. 9(B) to FIG. 10(B), for example. Furthermore, if the objects Ob1, Ob2 change within the virtual space (moved or deformed, for example) as a result of the game processing executed in the step S11, the change is reflected on the stereoscopic image of the upper LCD 12c.

If "NO" in the step S12, the process shifts to the step S13b to draw a planar image, and then, the process proceeds to the step S15. Here, the drawing processing itself in the step S13b is approximately the same as that in the above-described step S3 or S13a. That is, the LCD controller 12a alternately reads the left image 44L and the right image 44R stored in the VRAM 44c on a row-by-row basis, and draws them on the upper LCD 12c in order, but the left image 44L and the right image 44 are the same, and therefore, on the upper LCD 12c, the planar image as shown in FIG. 10(B) is displayed. Furthermore, since the barrier liquid crystal 12b is in an off state (S71: described later), both of the eyes can view all the rows of the planar image. However, assuming that the barrier liquid crystal 12b is kept on, the left eye can view the planar image of the odd rows, and the right eye can view the planar image of the even rows, for example, and therefore, visibility does not change (feels dark).

In the step S15, the input flag is reset, and it is determined whether or not the game is to be ended in the step S17. If "NO" here, the process returns to the step S5 to repeat processing similar to the above description. When an end operation is performed via the touch panel 16, etc., "YES" is determined in the step S17, and the processing is ended.

Figure 13:
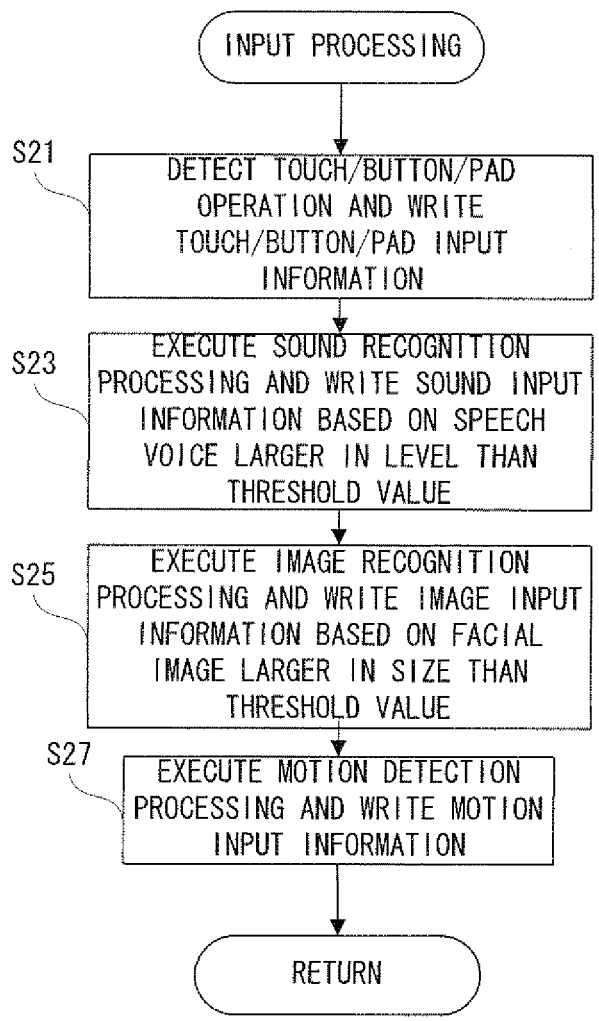
FIG. 13 is a flowchart showing another part of the operation by the CPU.

The input processing in the aforementioned step S5 is executed according to a subroutine in FIG. 13, for example. In a step S21, an input operation by the touch panel 16, various buttons (keys) 24a-24k, or the analog pad 26 is detected, and the touch/button/pad input information indicating the detection result is written to the input information area 82 together with a time stamp based on an output from the RTC 56a.

In a step S23, sound recognizing processing based on the sound input DB is performed on the sound data input through the microphone 30 to thereby confirm a speech voice of the player, and the sound input information indicating the recognition result is written together with a time stamp based on an output from the RTC 56a in the input information area 82. Here, even when the speech voice is recognized, if the level of the speech voice is equal to or less than a threshold value, regarding it as a speech voice of others different from the player (or there is nobody irrespective of whoever the person is), writing of the sound input information may not be performed.

In a step S25, image recognition processing based on the image input DB is performed on the image data input through the cameras 18a-18c to thereby recognize the face of the player and to moreover determine the orientation of the face and the direction of the eyeballs (gazing), and the image input information indicating these recognition and determination results is written to the input information area 82 together with the time stamp based on an output from the RTC 56a. Here, even if the facial image is recognized, if the size of the facial image (vertical and horizontal lengths, area, etc.) is equal to or less than a threshold value, regarding it as a face of others different from the player (or there is nobody irrespective of whoever the person is), and writing of the image input information may not be performed.

In a step S27, a movement of the game apparatus 10 itself is detected on the basis of the detection result by the acceleration sensor 54, and the motion input information indicating the detection result is written to the input information area 82 together with the time stamp based on an output from the RTC 56a. Thereafter, the process is restored to the main routine (see FIG. 12).

Figure 14:
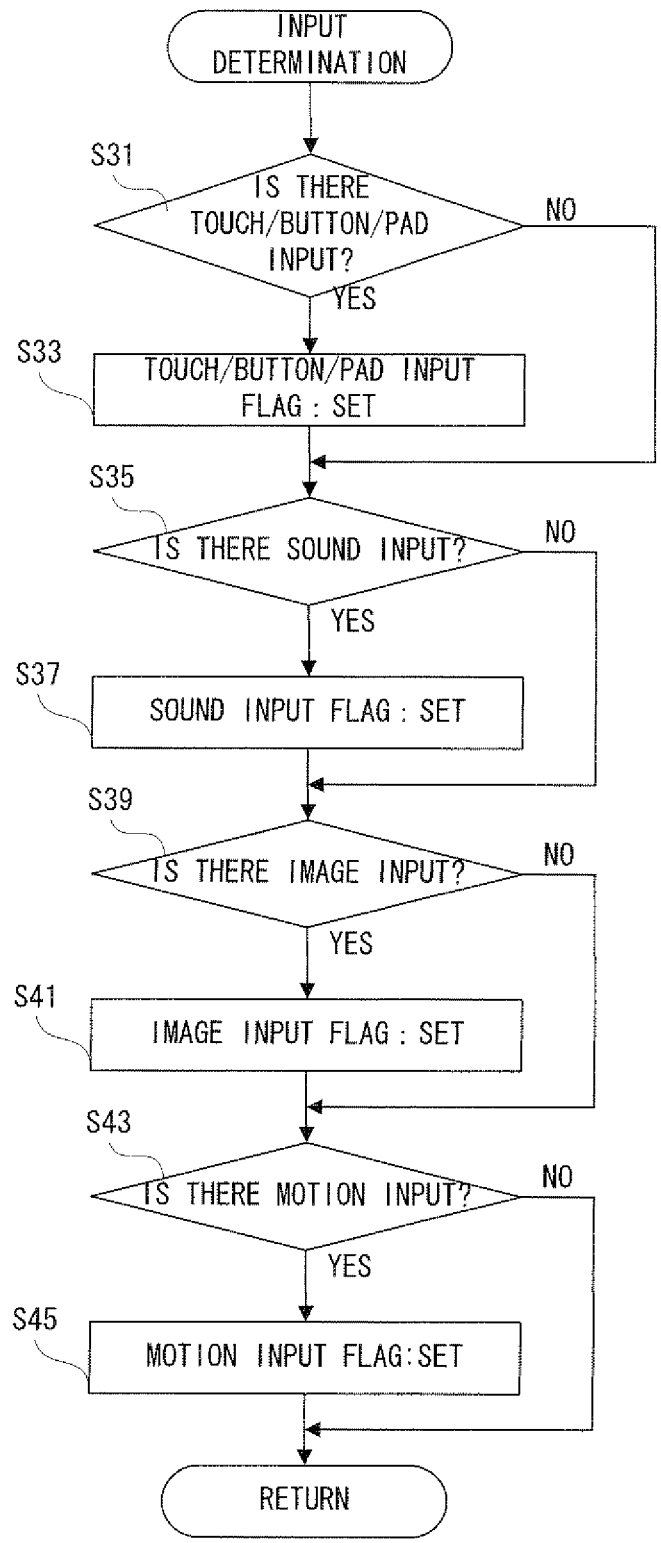
FIG. 14 is a flowchart showing a still another part of the operation by the CPU.
Figure 15:
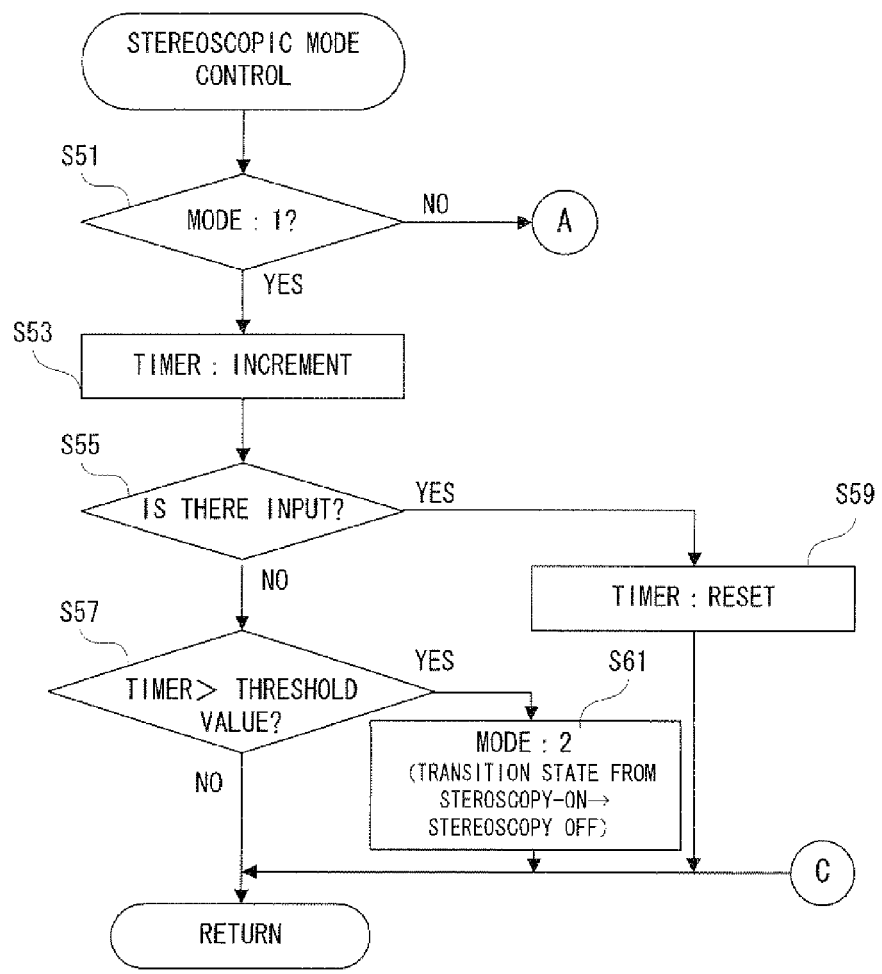
FIG. 15 is a flowchart showing a further part of the operation by the CPU.

The input determination in the aforementioned step S7 is executed according to a subroutine in FIG. 14, for example. In the subroutine, the CPU 44a determines whether or not there is an input to the game program 72 in this frame with reference to the aforementioned input information attached with time stamp of the input information area 82, and reflects the determination result on the input flag of the input flag area 84. More specifically, in a step S31, a presence or absence of a touch/button/pad input is first determined, and if "NO" here (absences of a relevant input), the process proceeds to a step S35. If "YES" in the step S31 (presence of a relevant input), the touch/button/pad input flag is set in a step S33, and the process proceeds to the step S35.

In the step S35, it is determined whether or not there is a sound input, and if "NO" here, the process proceeds to a step S39. If "YES" in the step S35, the sound input flag is set in a step S37, and then, the process proceeds to the step S39. In the step S39, it is determined whether or not there is an image input, and if "NO" here, the process proceeds to a step S43, If "YES" in the step S39, the image input flag is set in a step S41, and then, the process proceeds to the step S43. In the step S43, it is determined whether or not there is a motion input, and if "NO" here, the process is restored to the main routine. If "YES" in the step S43, the motion input flag is set in a step S45, and then, the process is restored to the main routine.

Figure 16:
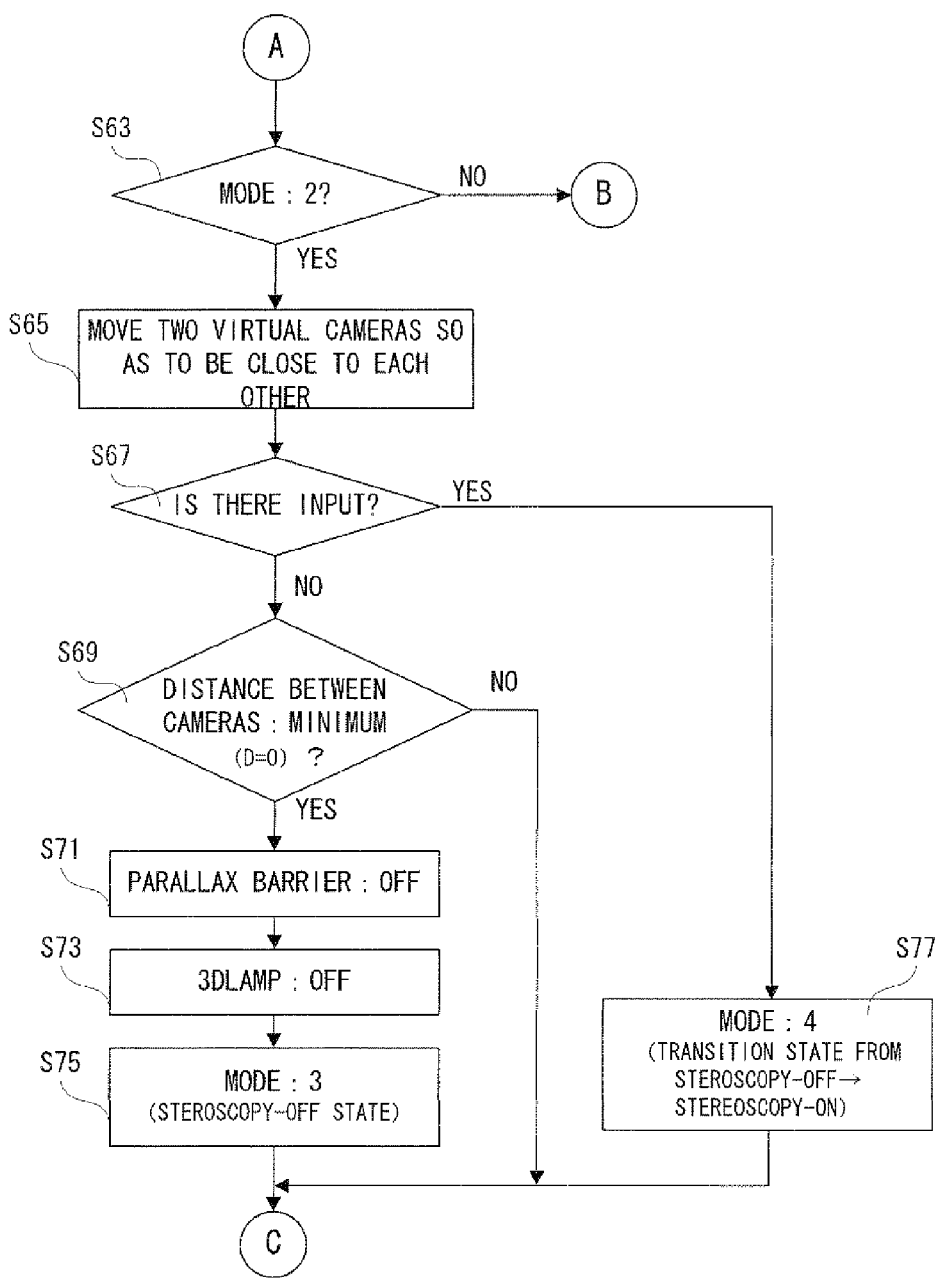
FIG. 16 is a flowchart showing another part of the operation by the CPU.

The stereoscopic mode control in the aforementioned step S9 is executed according to a subroutine in FIG. 15-FIG. 17, for example. Referring first to FIG. 15, in a step S51, it is determined whether or not the current stereoscopic mode is the mode 1 with reference to the mode information of the mode area 90, and if "NO" here, the process shifts to a step S63 (see FIG. 16). Here, directly after activation, the mode 1 is set in the step S1, and therefore, the determination result in the step S1 becomes "YES". If "YES" in the step S51, the timer (T) of the timer area 86 is incremented (for example T=T+(1/60) seconds) in a step S53, and then, the process proceeds to a step S55.

In the step S55, it is determined whether or not there is an input to the game program 72 with reference to the input flag of the input flag area 84 (specifically, four kinds of the touch/button/pad input flags, the sound input flag, the image input flag, and the motion input flag). If no input flag is set, "NO" is determined, and the process proceeds to a step S57. If any kind of the input flags is set, "YES" is determined, and the process shifts to a step S59.

In the step S57, it is determined whether or not the timer of the timer area 86 is above a threshold value (4 minutes, for example), and if "NO" here (T≤4 minutes), the process is restored to the main routine (see FIG. 12). If "YES" (T≤4 minutes) in the step S57, the process shifts to a step S61.

In the step S59, the timer of the timer area 86 is reset (T=0), and then, the process is restored to the main routine. In the step S61, the mode information of the mode area 90 is updated from the mode 1 to the mode 2, and then, the process is restored to the main routine.

Referring to FIG. 16, in the step S63, it is determined whether or not the current stereoscopic mode is the mode 2 with reference to the mode information of the mode area 90, and if "NO" here, the process shifts to a step S79 (see FIG. 17). If "YES" in the step S63, by changing the distance-between cameras D stored in the distance-between cameras area 88 only by one step (¼ mm, for example) in a direction in which the distance is decreased, the right and left virtual cameras ICL and ICR are moved to be close to each other in a step S65. In a case that the 1 step is ¼ mm, a time required for changing the distance-between cameras D from 65 mm (see FIG. 7) to 0 (see FIG. 10(A)) becomes about 4 seconds regarding one frame period as 1/60 seconds. Thereafter, the process proceeds to a step S67.

In the step S67, it is determined whether or not there is an input to the game program 72 with reference to the input flag of the input flag area 84. Here, if no input flag is also set similar to the step S55, "NO" is determined in the step S67, and the process proceeds to a step S69. If even one kind of input flag is set, "YES" is determined in the step S67, and the process shifts to a step S77.

In the step S69, it is determined whether or not the distance-between cameras D is the minimum. If D=0 (D≤0 under certain circumstances), "YES" is determined, and the process proceeds to a step S71. On the other hand, if D>0, "NO" is determined, and the process is restored to the main routine.

In the step S71, the barrier liquid crystal 12b (voltage application thereto) is turned off via the LCD controller 12a. In a next step S73, the 3D lamp 20A is turned off via the micon 56. Then, in a step S75, the mode information of the mode area 90 is updated from the mode 2 to the mode 3, and then, the process is restored to the main routine.

In the step S77, the mode information is updated from the mode 2 to the mode 4, and then, the process is restored to the main routine.

Referring to FIG. 17, in the step S79, it is determined whether or not the current stereoscopic mode is the mode 3 with reference to the mode information of the mode area 90, and if "NO" here, the process shifts to a step S89 (described later), regarding the current stereoscopic mode as a mode 4. If "YES" in the step S79, the process proceeds to a step S81.

In the step S81, it is determined whether or not there is an input to the game program 72 with reference to the input flag of the input flag area 84 as described above, and if "NO" here, the process is restored to the main routine. On the other hand, if "YES" in the step S81, the process proceeds to a step S83. In the step S83, the barrier liquid crystal 12b (voltage application thereto) is turned on via the LCD controller 12a. In a next step S85, the 3D lamp is turned on via the micon 56. Then, in a step S87, the mode information of the mode area 90 is updated from the mode 3 to the mode 4, and then, the process is restored to the main routine.

In the step S89, by changing the distance-between cameras D stored in the distance-between cameras area 88 only by one step (¼ mm, for example) in a direction in which the distance is increased, the right and left virtual cameras ICL and ICR are moved to be away from each other. In a next step S91, it is determined whether or not the distance-between cameras D is the maximum. If D=Sd×1×D0 (D≥Sd×1×D0 under certain circumstances), "YES" is determined, and the process proceeds to a step S93. On the other hand, if D<Sd×1×D0, "NO" is determined, and the process is restored to the main routine.

In the step S93, the timer of the timer area 86 is reset (T=0). In a next step S95, the mode information of the mode area 90 is updated from the mode 4 to the mode 1, and the process is restored to the main routine.

Accordingly, the stereoscopic mode of the stereoscopic LCD 12 is the mode 1 at first, that is, the stereoscopy-on state, and the timer is incremented every frame by repetitively performing the step S53. The timer is reset when any input is detected at this frame, and restarts incrementing at the next frame. If a predetermined time, for example, four minutes elapses without any input, the mode 1 changes to the mode 2, that is, the transition state from the stereoscopy-on state to the stereoscopy-off state.

In the mode 2, by repetitively performing the step S65, the right and left virtual cameras ICL and ICR approach every frame (FIG. 7→FIG. 9(A)), and when both of them arrive at the same position (unified: FIG. 10(A)), the mode 2 changes to the mode 3, that is, the stereoscopy-off state. Here, if an input is detected before the virtual cameras ICL and ICR arrive at the same position, the mode 2 changes to the mode 4, that is, the transition state from the stereoscopy-off state to the stereoscopy-on state.

When an input is detected in the mode 3, the mode 3 changes to the mode 4, that is, the transition state from the stereoscopy-off state to the stereoscopy-on state. In the mode 4, when by repetitively performing the step S89, the right and left virtual cameras ICL and ICR are far away from each other every frame (FIG. 10(A)→FIG. 9(A)), and both of them return to the initial position (space becomes the maximum: FIG. 7), and the mode 4 changes to the mode 1, that is, the stereoscopy-on state.

Here, the timer (T) is stopped in the modes 2 and 3, and reset at a time when the right and left virtual cameras ICL and ICR are returned to the initial position in the mode 4.

Furthermore, the barrier liquid crystal 12b and the 3D lamp 20A are turned on through the modes 1 and 2, are turned off at a timing when the mode 2 changes to the mode 3, are kept off in the mode 3, and are turned on at a timing when the mode 3 changes to the mode 4. It should be noted that the 3D lamp 20A is not necessarily cooperated with the barrier liquid crystal 12b, and may be displayed when the 3D display is made possible, for example. In this case, the 3D lamp 20A lights up even during the 2D display when the 3D display is made possible.

Here, the aforementioned determinations in the steps S69 and S91 may be performed on the variable Pd. More specifically, in the step S69, if Pd=0 (Pd≥1 under certain circumstances), "YES" is determined, and the process proceeds to the step S71. On the other hand, if Pd<1, "NO" is determined, and the process is restored to the main routine. Similarly, in the step S91, if Pd=1(Pd≥1 under certain circumstances), "YES" is determined, and the process proceeds to a step S93. On the other hand, if Pd<1, "NO" is determined, and the process is restored to the main routine.

It should be noted that all the four input determinations (S31, S35, S39 and S43) shown in FIG. 14 need not be performed, and any one input determination may be performed, or any two or three determinations may be performed in combination.

As understood from the above description, the game apparatus 10 of this embodiment displays a virtual space on the stereoscopic LCD 12 capable of making an autostereoscopic display (3D display), and images a stereoscopic image for displaying the objects Obj1, Obj2 in a three-dimensional manner (3D display) and a planar image for displaying the objects Obj1, Obj2 in a two-dimensional manner (2D display) with the virtual cameras ICL, ICR in the virtual space.

The CPU 44a of the game apparatus 10 makes a 3D display on the stereoscopic LCD 12 by using the imaged stereoscopic image (S3, S13a), and makes a 2D display on the stereoscopic LCD 12 by using the imaged planar image (S13b). It should be noted that in place of the stereoscopic image and the planar image imaged by the virtual cameras ICL, ICR, a stereoscopic image and a planar image which are prepared in advance or a stereoscopic image and a planar image which are acquired from outside may be displayed. Furthermore, an input from the touch panel 15, the buttons 24a-24k, the microphone 30, the cameras 18a-18c, etc. is accepted (S5), and in response to this input, the object is controlled (S11). Then, in a case that a non-input state continues over the predetermined period during the 3D display (S55:NO→S57:YES→S61-S75), the 3D display is switched to the 2D display (S12: YES→S13b). In addition, in a case that there is an input during the 2D display (S81:YES→S87), the CPU 44a switches the 2D display to the 3D display (S12:→S13a).

Accordingly, if there is no input during the 3D display for a predetermined time, the 3D display is automatically switched to the 2D display, and if there is an input during the 2D display, the 2D display automatically is switched to the 3D display. This saves the player from having to manually switch the stereoscopic mode, capable of enhancing customer convenience.

In the above description, the explanation is made on the game apparatus 10, but the present invention can be applied to a display controlling apparatus (PC, PDA, cellular phone, TV, electric photo frame, music/video player, various home information appliances, etc. other than the game apparatus) for displaying a virtual space on an autostereoscopic displayable display. The display (stereoscopic LCD 12, for example) may be contained in the display controlling apparatus, or may be provided separately from the display controlling apparatus. The input device (touch panel 16, buttons 24a-24k, analog pad 26, microphone 30, cameras 18a-18c, etc.) is also contained in or provided separately from the display controlling apparatus. The present invention can be applied to a display controlling system in which respective processing for a display control are distributedly executed by a plurality of computers, etc. In addition, the present invention can be applied to a game program, an application program, etc. for such a display controlling apparatus or such a system.

Although the present invention has been described and illustrated in detail, it is clearly understood that the same is by way of illustration and example only and is not to be taken by way of limitation, the spirit and scope of the present invention being limited only by the terms of the appended claims.

Furthermore, it should be understood that overall the embodiment of the present invention, a representation of a singular form also includes a concept of the plural form unless otherwise stated. Accordingly, an article or an adjective in the singular (for example, "a", "an", "the", etc. for English) also includes a concept of the plural form unless otherwise stated.

What is claimed is:

1. A non-transitory storage medium storing a display controlling program to be executed by a computer of a display controlling apparatus that makes a display on an autostereoscopic displayable display device, wherein
said display controlling program causes said computer to execute instructions comprising:
generating a stereoscopic display on said display device by utilizing a stereoscopic image;
generating a planar display on said display device by utilizing a planar image;
accepting an input from an input device; and
switching from the generated stereoscopic display to the generated planar display in a case that a state that no input is made from said input device continues past a predetermined time period during the display of the generated stereoscopic display.

2. The non-transitory storage medium storing a display controlling program according to claim 1, wherein
said display controlling apparatus is for displaying a virtual space on said display,
said display controlling program causes said computer to further execute instructions comprising:
imaging a stereoscopic image for displaying an object in a three-dimensional manner and a planar image for displaying said object in a two-dimensional manner in said virtual space, wherein a stereoscopic display is made on said display by utilizing the imaged stereoscopic image, and a planar display is made on said display by utilizing the imaged planar image.

3. The non-transitory storage medium storing a display controlling program according to claim 2, wherein said display controlling program causes said computer to execute instructions comprising:

imaging a left image and a right image by a left virtual camera and a right virtual camera arranged at a space within said virtual space such that said object is included in an imaging range of said left virtual camera and/or said right virtual camera during the display, and imaging an image such that said object is included in the imaging range by a virtual camera within said virtual space when said display switches to said display by said generated planar display.

4. The non-transitory storage medium storing a display controlling program according to claim 3, wherein any one the left image and the right image that are respectively imaged by said left virtual camera and said right virtual camera are displayed.

5. The non-transitory storage medium storing a display controlling program according to claim 3, wherein said virtual camera is positioned midway between said left virtual camera and said right virtual camera.

6. The non-transitory storage medium storing a display controlling program according to claim 3, wherein imaging is performed by moving said left virtual camera and said right virtual camera to a common position in response to a switch from said generated stereoscopic display to said generated planar display.

7. The non-transitory storage medium storing a display controlling program according to claim 6, wherein a left image and a right image are imaged by said left virtual camera and said right virtual camera spacedly arranged right and left with respect to said object within said virtual space during the display of said generated stereoscopic display.

8. The non-transitory storage medium storing a display controlling program according to claim 6, wherein any one of the left image and the right image that are respectively imaged by said left virtual camera and said right virtual camera at said common position are displayed.

9. The non-transitory storage medium storing a display controlling program according to claim 6, wherein the planar image is displayed based on both of the left image and the right image that are respectively imaged by said left virtual camera and said right virtual camera at said common position.

10. The non-transitory storage medium storing a display controlling program according to claim 6, wherein said common position is a position midway between the positions of said left virtual camera and said right virtual camera during the display of said generated stereoscopic display.

11. The non-transitory storage medium storing a display controlling program according to claim 10, wherein said left virtual camera and said right virtual camera are gradually moved to said midway position.

12. The non-transitory storage medium storing a display controlling program according to claim 11, wherein said left virtual camera and said right virtual camera are moved toward said midway position at a uniform velocity.

13. The non-transitory storage medium storing a display controlling program according to claim 1, wherein said display of said generated planar display is further switched to said generated stereoscopic display in a case that there is an input from said input device during said display of said generated planar display.

14. The non-transitory storage medium storing a display controlling program according to claim 7, wherein said left virtual camera and said right virtual camera that are placed at said common position with respect to said object are moved right and/or left in response to a switch from said display of said generated planar display to the display of said generated stereoscopic display.

15. The non-transitory storage medium storing a display controlling program according to claim 2, wherein a stereoscopic image which can display an object in a three-dimensional manner and a planar image which can display said object in a two-dimensional manner within said virtual space are imaged, and said display controlling program causes said computer to further execute instructions comprising:

controlling said object within said virtual space in response to an accepted input.

16. The non-transitory storage medium storing a display controlling program according to claim 15, wherein said object within said virtual space is automatically moved, and when an input is accepted, said object is controlled in response to said input.

17. The non-transitory storage medium storing a display controlling program according to claim 15, wherein said input device includes a manual operation input device, and manual operation input from said manually operation input device is accepted.

18. The non-transitory storage medium storing a display controlling program according to claim 15, wherein said input device includes a sound input device, and a sound input from said sound input device is accepted.

19. The non-transitory storage medium storing a display controlling program according to claim 15, wherein said input device includes an image input device, and an image input from said image input device is accepted.

20. The non-transitory storage medium storing a display controlling program according to claim 15, wherein said input device includes a motion input device, and a motion input from said motion input device is accepted.

21. The non-transitory storage medium storing a display controlling program according to claim 17, wherein a state that there is no input from any of said inputter is detected as said non-input state.

22. The non-transitory storage medium storing a display controlling program according to claim 1, wherein said display controlling apparatus has a manual operation input device, a manual operation input by said manual operation input device is detected, and a state that no manual operation is detected is regarded as said non-input state.

23. The non-transitory storage medium storing a display controlling program according to claim 1, wherein said display controlling apparatus has a sound input device, a speech voice from the sound input by said sound input device is detected, and a state that no speech voice is detected is regarded as said non-input state.

24. The non-transitory storage medium storing a display controlling program according to claim 23, wherein
a state that no speech voice larger in level than a threshold value is detected is regarded as said non-input state.

25. The non-transitory storage medium storing a display controlling program according to claim 1, wherein
said display controlling apparatus is provided with an imaging device,
a facial image from an image imaged by said imaging device is detected, and
a state that no facial image is detected is regarded as said non-input state.

26. The non-transitory storage medium storing a display controlling program according to claim 25, wherein
a state that no facial image larger in size than a threshold value is detected is regarded as said non-input state.

27. The non-transitory storage medium storing a display controlling program according to claim 1, wherein
said display controlling apparatus is provided with a motion sensor,
a motion of said display controlling apparatus is detected by said motion sensor, and
a state that no motion larger than a threshold value is detected is regarded as said non-input state.

28. The non-transitory storage medium storing a display controlling program according to claim 1, wherein
said display device is an autostereoscopic displayable display by a parallax barrier,
said display controlling program causes said computer to further execute instructions comprising:
applying a voltage to said parallax barrier in a case that a stereoscopic display is performed on said display, and not applying a voltage to said parallax barrier in a case that a planar display is performed on said display.

29. A display controlling apparatus making a display on an autostereoscopic displayable display device, comprising:
a stereoscopic displayer which makes a stereoscopic display on said display device by utilizing a stereoscopic image;
a planar displayer which makes a planar display on said display device by utilizing a planar image;
an input accepter which accepts an input from an input device; and
a display switcher which switches from the display by said stereoscopic displayer to the display by said planar displayer in a case that a state that no input is made from said input device to said input accepter continues past a predetermined time period during the display by said stereoscopic displayer.

30. A display controlling method by a display controlling apparatus making a display on an autostereoscopic displayable display device, comprising:
generating a stereoscopic display on said display device by utilizing a stereoscopic image;
generating a planar display on said display device by utilizing a planar image;
accepting an input from an input device; and
switching from the display of said generated stereoscopic display to the display of said generated planar display in a case that a non-input state from said input device continues past a predetermined time period during the display of said generated stereoscopic display.

31. A display controlling system making a display on an autostereoscopic displayable display device, comprising:
a memory; and
one or more processors operatively associated with the memory and configured to execute instructions comprising:
generating a stereoscopic display on said display device by utilizing a stereoscopic image,
generating a planar display on said display device by utilizing a planar image,
accepting an input from an input device, and
switching from the display of said generated stereoscopic display to the display of said generated planar display in a case that a state that no input is made from said input device continues past a predetermined time period during the display of said generated stereoscopic display.

32. The non-transitory storage medium storing a display controlling program according to claim 1, wherein in said switching the display is switched to display of said generated planar display from said generated stereoscopic display by moving at least two virtual cameras to different positions in a virtual space.

33. The apparatus of claim 29, wherein in said switching the display is switched to display of said generated planar display from said generated stereoscopic display by moving at least two virtual cameras to different positions in a virtual space.

34. The method of claim 30, wherein in said switching the display is switched to display of said generated planar display from said generated stereoscopic display by moving at least two virtual cameras to different positions in a virtual space.

35. The system of claim 31, wherein in said switching the display is switched to display of said generated planar display from said generated stereoscopic display by moving at least two virtual cameras to different positions in a virtual space.

36. The non-transitory storage medium of claim 1, wherein in said switching, the display is switched to display of said generated planar display from said generated stereoscopic display by moving at least one of two virtual cameras to a different position in a virtual space so that the two virtual cameras are closer together.

37. The apparatus of claim 29, wherein in said switching, the display is switched to display of said generated planar display from said generated stereoscopic display by moving at least one of two virtual cameras to a different position in a virtual space so that the two virtual cameras are closer together.

38. The method of claim 30, wherein in said switching, the display is switched to display of said generated planar display from said generated stereoscopic display by moving at least one of two virtual cameras to a different position in a virtual space so that the two virtual cameras are closer together.

39. The system of claim 31, wherein in said switching, the display is switched to display of said generated planar display from said generated stereoscopic display by moving at least one of two virtual cameras to a different position in a virtual space so that the two virtual cameras are closer together.

* * * * *